US012519791B2

(12) United States Patent
Grzonkowski et al.

(10) Patent No.: US 12,519,791 B2
(45) Date of Patent: Jan. 6, 2026

(54) ASSIGNMENT OF RESOURCE CRITICALITY SCORES TO CLOUD RESOURCES BASED ON CLOUD RESOURCE CLASS

(71) Applicant: Tenable, Inc., Columbia, MD (US)

(72) Inventors: Slawomir Grzonkowski, Dublin (IE); Bartłomiej Uscilowski, Dublin (IE); Bryan Peter Doyle, Dublin (IE); Vincent Gilcreest, Dublin (IE)

(73) Assignee: Tenable, Inc., Columbia, MD (US)

( * ) Notice: Subject to any disclaimer, the term of this patent is extended or adjusted under 35 U.S.C. 154(b) by 192 days.

(21) Appl. No.: 18/469,099

(22) Filed: Sep. 18, 2023

(65) Prior Publication Data
US 2025/0097227 A1    Mar. 20, 2025

(51) Int. Cl.
*H04L 9/40* (2022.01)
*G06N 3/0455* (2023.01)
*G06N 3/088* (2023.01)
*H04L 41/16* (2022.01)
*H04L 47/80* (2022.01)

(52) U.S. Cl.
CPC .......... *H04L 63/10* (2013.01); *G06N 3/0455* (2023.01); *G06N 3/088* (2013.01); *H04L 41/16* (2013.01); *H04L 47/805* (2013.01); *H04L 63/1425* (2013.01); *H04L 63/1433* (2013.01); *H04L 63/1441* (2013.01)

(58) Field of Classification Search
CPC ....... H04L 63/10; H04L 41/16; H04L 47/805; H04L 63/1425; H04L 63/1433; H04L 63/1441; G06N 3/0455; G06N 3/088
See application file for complete search history.

(56) References Cited

U.S. PATENT DOCUMENTS

| 9,954,883 | B2 | 4/2018 | Ahuja et al. |
| 10,250,603 | B1* | 4/2019 | Roth .................. H04L 63/10 |
| 11,258,817 | B2 | 2/2022 | Sheridan et al. |
| 2013/0031158 | A1* | 1/2013 | Salsburg ............... G06F 9/5077 709/203 |
| 2015/0006675 | A1* | 1/2015 | Kaiser .................... H04L 67/51 709/219 |
| 2017/0178137 | A1* | 6/2017 | Pachouri ............. H04L 63/0838 |
| 2017/0186008 | A1* | 6/2017 | Pachouri ................. H04L 63/18 |

(Continued)

FOREIGN PATENT DOCUMENTS

CN        113239360 A    8/2021

OTHER PUBLICATIONS

Qualys Release Notes, "Qualys Global AssetView/CyberSecurity Asset Management v2.x", Jul. 29, 2021, Copyright 2021 by Qualys, Inc., pp. 1-6.

(Continued)

*Primary Examiner* — El Hadji M Sall
(74) *Attorney, Agent, or Firm* — Muncy, Geissler, Olds & Lowe, P.C.; Daniel Podhajny

(57) ABSTRACT

In an aspect, a machine-learning (ML)-based classifier or regressor associated with a respective cloud resource class by is trained inputting information samples and resource criticality scores for the respective cloud resource class as training data. In a further aspect, the ML-based classifier or regressor is further utilized to assign a resource criticality score to a particular cloud resource in the respective cloud resource class.

24 Claims, 19 Drawing Sheets

(56) References Cited

U.S. PATENT DOCUMENTS

| | | | |
|---|---|---|---|
| 2020/0285737 A1* | 9/2020 | Kraus | G06F 21/552 |
| 2021/0051153 A1* | 2/2021 | Bogdanich Espina | H04L 63/105 |
| 2021/0243190 A1* | 8/2021 | Bargury | G06N 3/08 |
| 2022/0382785 A1 | 12/2022 | Patel et al. | |
| 2023/0042671 A1 | 2/2023 | Zaman et al. | |
| 2024/0406213 A1* | 12/2024 | Sengupta | H04L 63/105 |

OTHER PUBLICATIONS

Qualys Global AssetView CyberSecurity Asset Management, Quick Start Guide, Aug. 5, 2022, pp. 1-23.

* cited by examiner

| DISTRIBUTION LOOKUP TABLE | |
|---|---|
| Cost | |
| Has GPU | |
| Memory [GB] | |
| Logging Enabled | |
| Backup Retention Delays | |
| Has Snapshots | |
| Encrypted Disk | |
| Network Performance | |
| Has Replicas | |
| Has Autobackups | |
| Publicly Accessible | |
| SSD Storage | |
| Storage in GB | |
| Iops | |

*FIG. 10*

| Language Tokenizer Table ||
|---|---|
| prod | 1 |
| www | 1 |
| test | 0 |
| dev | 0 |
| machine | 0 |
| server | 1 |
| stage | 1 |
| sql | 1 |
| db | 1 |

*FIG. 11*

|  | db prod | Attribute Score |
|---|---|---|
| Device Name | prod-sql | 2 |
| Cost | 2 usd/h | 2 |
| Has GPU | FALSE | 0 |
| Memory [GB] | 64 | 2 |
| Logging Enabled | TRUE | 1 |
| Backup Retention Delays | 7 | 1 |
| Has Snapshots | TRUE | 1 |
| User Tags | prod sql db | 3 |
| Encrypted Disk | TRUE | 1 |
| Network Performance | 5 Gbit | 2 |
| Has Replicas | TRUE | 1 |
| Has Autobackups | TRUE | 1 |
| Publicly Accessible | FALSE | 0 |
| SSD Storage | TRUE | 1 |
| Storage in GB | 2000 | 2 |
| Iops | 1200 | 2 |
|  | score | 22 |
|  | normalized | 10 |

*FIG. 12*

|  | vm instance 2 | Attribute Score |
|---|---|---|
| Device Name | test-dev | 0 |
| Cost | 0.01 usd/h | 0 |
| Has GPU | FALSE | 0 |
| Memory [GB] | 8 | 0 |
| Logging Enabled | FALSE | 0 |
| Backup Retention Delays | 0 | 0 |
| Has Snapshots | FALSE | 0 |
| User Tags | test machine | 0 |
| Encrypted Disk | FALSE | 0 |
| Network Performance | 1 Gbit | 1 |
| Has Replicas | FALSE | 0 |
| Has Autobackups | FALSE | 0 |
| Publicly Accessible | TRUE | 1 |
| SSD Storage | FALSE | 0 |
| Storage in GB | 20 | 0 |
| Iops | 100 | 0 |
|  | score | 2 |
|  | normalized | 1 |

*FIG. 13*

|  | db stage | Attribute Score |
|---|---|---|
| Device Name | stage-sql | 2 |
| Cost | 0.1 usd/h | 1 |
| Has GPU | FALSE | 0 |
| Memory [GB] | 32 | 1 |
| Logging Enabled | TRUE | 1 |
| Backup Retention Delays | 7 | 1 |
| Has Snapshots | FALSE | 0 |
| User Tags | sql for tests | 1 |
| Encrypted Disk | TRUE | 1 |
| Network Performance | 5 Gbit | 2 |
| Has Replicas | FALSE | 0 |
| Has Autobackups | FALSE | 0 |
| Publicly Accessible | FALSE | 0 |
| SSD Storage | FALSE | 0 |
| Storage in GB | 100 | 0 |
| Iops | 300 | 0 |
|  | score | 10 |
|  | normalized | 5 |

*FIG. 14*

|  | vm instance 1 | Attribute Score |
|---|---|---|
| Device Name | dev | 0 |
| Cost | 0.01 usd/h | 0 |
| Has GPU | FALSE | 0 |
| Memory [GB] | 32 | 1 |
| Logging Enabled | FALSE | 0 |
| Backup Retention Delays | 0 | 0 |
| Has Snapshots | FALSE | 0 |
| User Tags | dev machine | 1 |
| Encrypted Disk | TRUE | 1 |
| Network Performance | 5 Gbit | 2 |
| Has Replicas | FALSE | 0 |
| Has Autobackups | FALSE | 0 |
| Publicly Accessible | FALSE | 0 |
| SSD Storage | TRUE | 1 |
| Storage in GB | 100 | 0 |
| Iops | 600 | 1 |
|  | score | 3 |
|  | normalized | 10 |

*FIG. 15*

ASSIGNMENT OF RESOURCE CRITICALITY SCORES TO CLOUD RESOURCES BASED ON CLOUD RESOURCE CLASS

STATEMENT REGARDING PRIOR DISCLOSURES BY THE INVENTOR OR A JOINT INVENTOR UNDER 37 C.F.R. 1.77 (b) (6)

On Mar. 15, 2023, the Applicant publicly released a document entitled "TENABLE ONE SCORING EXPLAINED". This document includes a section entitled "CLOUD RESOURCES (TENABLE CLOUD SECURITY)," which in turn included a sub-section entitled "ASSET CRITICALITY RATING". The subject matter in the sub-section entitled "ASSET CRITICALITY RATING" is a disclosure by the inventor, a joint inventor, or another who obtained the subject matter directly or indirectly from the inventor or joint inventor, and was made 1 year or less before the effective filing date of the subject application, and as such qualifies as a grace period inventor-originated disclosure that is subject to the prior art exception under AIA 35 U.S.C. 102(b)(1)(A).

BACKGROUND OF THE DISCLOSURE

1. Field of the Disclosure

Aspects relate to assignment of resource criticality scores to cloud resources based on cloud resource class.

2. Description of the Related Art

An asset criticality rating (ACR) rates the criticality of an asset to an organization. ACRs may be assigned to network assets that are directly owned by an enterprise and directly controlled by a network administrator.

Modern organizations are increasingly preferring to rent resources from cloud-based service providers (or cloud provider) instead of purchasing, maintaining and managing them directly. This approach has a number of benefits, such as delegating the costs of hardware disposal to the cloud provider, flexibility in configuration changes, adaptability to business needs, and ease of obtaining new resources. These factors have led to the rapid growth of many organizations' cloud-based infrastructure. However, these cloud resources have become difficult to manage for a single system administrator, as such cloud resources often span multiple internal organizations and teams.

Furthermore, cloud infrastructure significantly expands the attack surface, as any of its parts may potentially become infected with malicious code or vulnerable software at any time. This necessitates quick detection of cloud resources that have the most significant impact on a given organization's business. This value will also ideally be explainable to understand the scope and reasons behind such a verdict.

Cloud resources are assigned by cloud providers to their customers, and typically include some combination of cloud hardware and/or source attributes allocated for a particular task or application. Examples of cloud resources include virtual machines, databases, web servers, and email services. These components are often critical for businesses that use them. However, when dealing with hundreds or thousands of such cloud resources, it may not be obvious for the owner to understand which ones are critical to operate.

In contrast to network asset ACR calculation, in some vulnerability management systems, cloud resources are typically assigned a criticality default score in accordance via a simple rule-based methodology that is based on their cloud resource categorization (e.g., assign all Amazon EC2 instances, Google or Azure virtual machines (VMs), etc., a criticality score of "3", etc.).

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a security component includes receiving one or more information samples that characterize one or more attributes of a cloud resource of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein the cloud resource is associated with a set of shareable hardware and/or software resources of the backend platform, and wherein the cloud resource is associated with a cloud resource class that corresponds to one of a plurality of cloud resource classes supported by the cloud network; converting the one or more information samples into vectorized data associated with a set of attribute categories; deriving a resource criticality score associated with the cloud resource based on the vectorized data and a machine-learning (ML)-based classifier or regressor that is trained based on training data associated with the cloud resource class that is processed by rule-based heuristics; and performing one or more infrastructure security functions based on the resource criticality score associated with the cloud resource.

In some aspects, the one or more information samples comprise: cost information, or software information, or purpose information, or security control information, or customer-defined tag information, or component-specific configuration information, or cloud network configuration information, information extracted from an operating system (OS) of the component, or any combination thereof.

In some aspects, the one or more information samples are associated with a JavaScript Object Notation (JSON) configuration file.

In some aspects, the cloud resource class corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

In some aspects, the cloud network is a public cloud network, a private cloud network, a hybrid cloud network, or a multicloud network.

In some aspects, the rule-based heuristics associated with the cloud resource class comprise: determining a probability distribution of a set of vectorized data attributes associated with a training cloud resource associated with the cloud resource class; assigning a score to each vectorized data attribute in the set of vectorized data attributes based on the probability distribution; scaling each score in accordance with a cloud resource class-specific scaling factor; and normalizing each scaled score for each cloud resource class to produce cloud resource class-specific resource criticality scores.

In some aspects, the probability distribution is associated with one or more lookup tables, one or more language tokens, or both.

In some aspects, the ML-based classifier or regressor is trained based on the probability distribution, the set of vectorized data attributes, and the cloud resource class-specific resource criticality scores.

In some aspects, the set of vectorized data attributes is obtained by: passing a first set of information samples in textual form through a ML-based sentence transformer to produce a set of fixed-length text vectors, or transforming a second set of information samples into n-gram representations, or a combination thereof.

In some aspects, the converting comprises: passing a first set of information samples in textual form through a ML-based sentence transformer to produce a set of fixed-length text vectors, or transforming a second set of information samples into n-gram representations, or a combination thereof.

In some aspects, the vectorized data comprises data that is produced via a ML-based sentence transformer and the ML-based classifier or regressor comprises a neural network (NN), or the vectorized data comprises n-gram representations and the ML-based classifier or regressor is configured to perform logistic regression on the n-gram representations.

In some aspects, the one or more infrastructure security functions comprise: performing a security scan on the cloud resource, or performing one or more actions to mitigate and/or remediate a vulnerability and/or exploit associated with the cloud resource, or outputting a security report associated with the cloud resource, or any combination thereof.

In an aspect, a method of operating a training component includes receiving information samples that characterize attributes of a set of cloud resources of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein each cloud resource of the set of cloud resources is associated with a set of shareable hardware and/or software resources of the backend platform, and wherein each cloud resource of the set of cloud resources is associated with a cloud resource class that corresponds to one of a plurality of cloud resource classes supported by the cloud network; assigning resource criticality scores for each cloud resource class associated with the set of cloud resource classes based on the information samples and rule-based heuristics; and training, for each cloud resource class associated with the set of cloud resource classes, a machine-learning (ML)-based classifier or regressor associated with the respective cloud resource class by inputting the information samples and the resource criticality scores for the respective cloud resource class as training data.

In some aspects, the assigning comprises, for each cloud resource of the set of cloud resources: determining a probability distribution of a set of vectorized data attributes associated with the cloud resource associated with the cloud resource class; assigning a score to each vectorized data attribute in the set of vectorized data attributes based on the probability distribution; scaling each score in accordance with a cloud resource class-specific scaling factor; and normalizing each scaled score for each cloud resource class to produce cloud resource class-specific resource criticality scores.

In some aspects, the probability distribution is associated with one or more lookup tables, one or more language tokens, or both.

In some aspects, the ML-based classifier or regressor is trained based on the probability distribution, the set of vectorized data attributes, and the cloud resource class-specific resource criticality scores.

In some aspects, the set of vectorized data attributes is obtained by: passing a first set of information samples in textual form through a ML-based sentence transformer to produce a set of fixed-length text vectors, or transforming a second set of information samples into n-gram representations, or a combination thereof.

In some aspects, the set of vectorized data attributes comprises vectorized data that is vectorized from the information samples.

In some aspects, the vectorized data comprises data that is produced via a ML-based sentence transformer and the ML-based classifier or regressor comprises a neural network (NN), or the vectorized data comprises n-gram representations and the ML-based classifier or regressor is configured to perform logistic regression on the n-gram representations.

In some aspects, the method includes refining, for at least one cloud resource class associated with the set of cloud resource classes, the ML-based classifier or regressor associated with the at least one cloud resource class by inputting new information samples and new resource criticality scores for the at least one cloud resource class as new training data.

In some aspects, the information samples comprise: cost information, or software information, or purpose information, or security control information, or customer-defined tag information, or component-specific configuration information, or cloud network configuration information, information extracted from an operating system (OS) of the component, or any combination thereof.

In some aspects, the information samples are associated with a JavaScript Object Notation (JSON) configuration file.

In some aspects, at least one cloud resource cloud of the set of cloud resources corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

In some aspects, the cloud network is a public cloud network, a private cloud network, a hybrid cloud network, or a multicloud network.

In an aspect, a security component includes one or more memories; one or more transceivers; and one or more processors communicatively coupled to the one or more memories and the one or more transceivers, the one or more processors, either alone or in combination, configured to: receive, via the one or more transceivers, one or more information samples that characterize one or more attributes of a cloud resource of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein the cloud resource is associated with a set of shareable hardware and/or software resources of the backend platform, and wherein the cloud resource is associated with a cloud resource class that corresponds to one of a plurality of cloud resource classes supported by the cloud network; convert the one or more information samples into vectorized data associated with a set of attribute categories; derive a resource criticality score associated with the cloud resource based on the vectorized data and a machine-learning (ML)-based classifier or regressor that is trained based on training data associated with the cloud resource class that is processed by rule-based heuristics; and perform one or more infrastructure security functions based on the resource criticality score associated with the cloud resource.

In some aspects, the one or more information samples comprise: cost information, or software information, or purpose information, or security control information, or customer-defined tag information, or component-specific configuration information, or cloud network configuration information, information extracted from an operating system (OS) of the component, or any combination thereof.

In some aspects, the one or more information samples are associated with a JavaScript Object Notation (JSON) configuration file.

In some aspects, the cloud resource class corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

In some aspects, the cloud network is a public cloud network, a private cloud network, a hybrid cloud network, or a multicloud network.

In some aspects, the rule-based heuristics associated with the cloud resource class comprise: determine a probability distribution of a set of vectorized data attributes associated with a training cloud resource associated with the cloud resource class; assign a score to each vectorized data attribute in the set of vectorized data attributes based on the probability distribution; scale each score in accordance with a cloud resource class-specific scaling factor; and normalize each scaled score for each cloud resource class to produce cloud resource class-specific resource criticality scores.

In some aspects, the probability distribution is associated with one or more lookup tables, one or more language tokens, or both.

In some aspects, the ML-based classifier or regressor is trained based on the probability distribution, the set of vectorized data attributes, and the cloud resource class-specific resource criticality scores.

In some aspects, the set of vectorized data attributes is obtained by: pass a first set of information samples in textual form through a ML-based sentence transformer to produce a set of fixed-length text vectors, or transform a second set of information samples into n-gram representations, or a combination thereof.

In some aspects, the converting comprises: pass a first set of information samples in textual form through a ML-based sentence transformer to produce a set of fixed-length text vectors, or transform a second set of information samples into n-gram representations, or a combination thereof.

In some aspects, the vectorized data comprises data that is produced via a ML-based sentence transformer and the ML-based classifier or regressor comprises a neural network (NN), or the vectorized data comprises n-gram representations and the ML-based classifier or regressor is configured to perform logistic regression on the n-gram representations.

In some aspects, the one or more infrastructure security functions comprise: perform a security scan on the cloud resource, or perform one or more actions to mitigate and/or remediate a vulnerability and/or exploit associated with the cloud resource, or outputting a security report associated with the cloud resource, or any combination thereof.

In an aspect, a training component includes one or more memories; one or more transceivers; and one or more processors communicatively coupled to the one or more memories and the one or more transceivers, the one or more processors, either alone or in combination, configured to: receive, via the one or more transceivers, information samples that characterize attributes of a set of cloud resources of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein each cloud resource of the set of cloud resources is associated with a set of shareable hardware and/or software resources of the backend platform, and wherein each cloud resource of the set of cloud resources is associated with a cloud resource class that corresponds to one of a plurality of cloud resource classes supported by the cloud network; assign resource criticality scores for each cloud resource class associated with the set of cloud resource classes based on the information samples and rule-based heuristics; and train, for each cloud resource class associated with the set of cloud resource classes, a machine-learning (ML)-based classifier or regressor associated with the respective cloud resource class by inputting the information samples and the resource criticality scores for the respective cloud resource class as training data.

In some aspects, the assigning comprises, for each cloud resource of the set of cloud resources: determine a probability distribution of a set of vectorized data attributes associated with the cloud resource associated with the cloud resource class; assign a score to each vectorized data attribute in the set of vectorized data attributes based on the probability distribution; scale each score in accordance with a cloud resource class-specific scaling factor; and normalize each scaled score for each cloud resource class to produce cloud resource class-specific resource criticality scores.

In some aspects, the probability distribution is associated with one or more lookup tables, one or more language tokens, or both.

In some aspects, the ML-based classifier or regressor is trained based on the probability distribution, the set of vectorized data attributes, and the cloud resource class-specific resource criticality scores.

In some aspects, the set of vectorized data attributes is obtained by: pass a first set of information samples in textual form through a ML-based sentence transformer to produce a set of fixed-length text vectors, or transform a second set of information samples into n-gram representations, or a combination thereof.

In some aspects, the set of vectorized data attributes comprises vectorized data that is vectorized from the information samples.

In some aspects, the vectorized data comprises data that is produced via a ML-based sentence transformer and the ML-based classifier or regressor comprises a neural network (NN), or the vectorized data comprises n-gram representations and the ML-based classifier or regressor is configured to perform logistic regression on the n-gram representations.

In some aspects, the one or more processors, either alone or in combination, are further configured to: refine, for at least one cloud resource class associated with the set of cloud resource classes, the ML-based classifier or regressor associated with the at least one cloud resource class by inputting new information samples and new resource criticality scores for the at least one cloud resource class as new training data.

In some aspects, the information samples comprise: cost information, or software information, or purpose information, or security control information, or customer-defined tag information, or component-specific configuration information, or cloud network configuration information, information extracted from an operating system (OS) of the component, or any combination thereof.

In some aspects, the information samples are associated with a JavaScript Object Notation (JSON) configuration file.

In some aspects, at least one cloud resource cloud of the set of cloud resources corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

In some aspects, the cloud network is a public cloud network, a private cloud network, a hybrid cloud network, or a multicloud network.

In an aspect, a security component includes means for receiving one or more information samples that characterize one or more attributes of a cloud resource of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein the cloud resource is associated with a set of shareable hardware and/or software resources of the backend platform, and wherein the cloud resource is associated with a cloud resource class that corresponds to one of a plurality of cloud resource classes supported by the cloud network; means for converting the one or more information samples into vectorized data associated with a set of attribute categories; means for deriving a resource criticality score associated with the cloud resource based on the vectorized data and a machine-learning (ML)-based classifier or regressor that is trained based on training data associated with the cloud resource class that is processed by rule-based heuristics; and means for performing one or more infrastructure security functions based on the resource criticality score associated with the cloud resource.

In some aspects, the one or more information samples comprise: cost information, or software information, or purpose information, or security control information, or customer-defined tag information, or component-specific configuration information, or cloud network configuration information, information extracted from an operating system (OS) of the component, or any combination thereof.

In some aspects, the one or more information samples are associated with a JavaScript Object Notation (JSON) configuration file.

In some aspects, the cloud resource class corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

In some aspects, the cloud network is a public cloud network, a private cloud network, a hybrid cloud network, or a multicloud network.

In some aspects, the rule-based heuristics associated with the cloud resource class comprise: means for determining a probability distribution of a set of vectorized data attributes associated with a training cloud resource associated with the cloud resource class; means for assigning a score to each vectorized data attribute in the set of vectorized data attributes based on the probability distribution; means for scaling each score in accordance with a cloud resource class-specific scaling factor; and means for normalizing each scaled score for each cloud resource class to produce cloud resource class-specific resource criticality scores.

In some aspects, the probability distribution is associated with one or more lookup tables, one or more language tokens, or both.

In some aspects, the ML-based classifier or regressor is trained based on the probability distribution, the set of vectorized data attributes, and the cloud resource class-specific resource criticality scores.

In some aspects, the set of vectorized data attributes is obtained by: means for passing a first set of information samples in textual form through a ML-based sentence transformer to produce a set of fixed-length text vectors, or means for transforming a second set of information samples into n-gram representations, or a combination thereof.

In some aspects, the converting comprises: means for passing a first set of information samples in textual form through a ML-based sentence transformer to produce a set of fixed-length text vectors, or means for transforming a second set of information samples into n-gram representations, or a combination thereof.

In some aspects, the vectorized data comprises data that is produced via a ML-based sentence transformer and the ML-based classifier or regressor comprises a neural network (NN), or the vectorized data comprises n-gram representations and the ML-based classifier or regressor is configured to perform logistic regression on the n-gram representations.

In some aspects, the one or more infrastructure security functions comprise: means for performing a security scan on the cloud resource, or means for performing one or more actions to mitigate and/or remediate a vulnerability and/or exploit associated with the cloud resource, or outputting a security report associated with the cloud resource, or any combination thereof.

In an aspect, a training component includes means for receiving information samples that characterize attributes of a set of cloud resources of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein each cloud resource of the set of cloud resources is associated with a set of shareable hardware and/or software resources of the backend platform, and wherein each cloud resource of the set of cloud resources is associated with a cloud resource class that corresponds to one of a plurality of cloud resource classes supported by the cloud network; means for assigning resource criticality scores for each cloud resource class associated with the set of cloud resource classes based on the information samples and rule-based heuristics; and means for training, for each cloud resource class associated with the set of cloud resource classes, a machine-learning (ML)-based classifier or regressor associated with the respective cloud resource class by inputting the information samples and the resource criticality scores for the respective cloud resource class as training data.

In some aspects, the assigning comprises, for each cloud resource of the set of cloud resources: means for determining a probability distribution of a set of vectorized data attributes associated with the cloud resource associated with the cloud resource class; means for assigning a score to each vectorized data attribute in the set of vectorized data attributes based on the probability distribution; means for scaling each score in accordance with a cloud resource class-specific scaling factor; and means for normalizing each scaled score for each cloud resource class to produce cloud resource class-specific resource criticality scores.

In some aspects, the probability distribution is associated with one or more lookup tables, one or more language tokens, or both.

In some aspects, the ML-based classifier or regressor is trained based on the probability distribution, the set of vectorized data attributes, and the cloud resource class-specific resource criticality scores.

In some aspects, the set of vectorized data attributes is obtained by: means for passing a first set of information samples in textual form through a ML-based sentence transformer to produce a set of fixed-length text vectors, or means for transforming a second set of information samples into n-gram representations, or a combination thereof.

In some aspects, the set of vectorized data attributes comprises vectorized data that is vectorized from the information samples.

In some aspects, the vectorized data comprises data that is produced via a ML-based sentence transformer and the ML-based classifier or regressor comprises a neural network (NN), or the vectorized data comprises n-gram representations and the ML-based classifier or regressor is configured to perform logistic regression on the n-gram representations.

In some aspects, the apparatus includes means for refining, at least one cloud resource class associated with the set of cloud resource classes, the ML-based classifier or regressor associated with the at least one cloud resource class by inputting new information samples and new resource criticality scores for the at least one cloud resource class as new training data.

In some aspects, the information samples comprise: cost information, or software information, or purpose information, or security control information, or customer-defined tag information, or component-specific configuration information, or cloud network configuration information, information extracted from an operating system (OS) of the component, or any combination thereof.

In some aspects, the information samples are associated with a JavaScript Object Notation (JSON) configuration file.

In some aspects, at least one cloud resource cloud of the set of cloud resources corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

In some aspects, the cloud network is a public cloud network, a private cloud network, a hybrid cloud network, or a multicloud network.

In an aspect, a non-transitory computer-readable medium storing computer-executable instructions that, when executed by a security component, cause the security component to: receive one or more information samples that characterize one or more attributes of a cloud resource of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein the cloud resource is associated with a set of shareable hardware and/or software resources of the backend platform, and wherein the cloud resource is associated with a cloud resource class that corresponds to one of a plurality of cloud resource classes supported by the cloud network; convert the one or more information samples into vectorized data associated with a set of attribute categories; derive a resource criticality score associated with the cloud resource based on the vectorized data and a machine-learning (ML)-based classifier or regressor that is trained based on training data associated with the cloud resource class that is processed by rule-based heuristics; and perform one or more infrastructure security functions based on the resource criticality score associated with the cloud resource.

In some aspects, the one or more information samples comprise: cost information, or software information, or purpose information, or security control information, or customer-defined tag information, or component-specific configuration information, or cloud network configuration information, information extracted from an operating system (OS) of the component, or any combination thereof.

In some aspects, the one or more information samples are associated with a JavaScript Object Notation (JSON) configuration file.

In some aspects, the cloud resource class corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

In some aspects, the cloud network is a public cloud network, a private cloud network, a hybrid cloud network, or a multicloud network.

In some aspects, the rule-based heuristics associated with the cloud resource class comprise: determine a probability distribution of a set of vectorized data attributes associated with a training cloud resource associated with the cloud resource class; assign a score to each vectorized data attribute in the set of vectorized data attributes based on the probability distribution; scale each score in accordance with a cloud resource class-specific scaling factor; and normalize each scaled score for each cloud resource class to produce cloud resource class-specific resource criticality scores.

In some aspects, the probability distribution is associated with one or more lookup tables, one or more language tokens, or both.

In some aspects, the ML-based classifier or regressor is trained based on the probability distribution, the set of vectorized data attributes, and the cloud resource class-specific resource criticality scores.

In some aspects, the set of vectorized data attributes is obtained by: pass a first set of information samples in textual form through a ML-based sentence transformer to produce a set of fixed-length text vectors, or transform a second set of information samples into n-gram representations, or a combination thereof.

In some aspects, the converting comprises: pass a first set of information samples in textual form through a ML-based sentence transformer to produce a set of fixed-length text vectors, or transform a second set of information samples into n-gram representations, or a combination thereof.

In some aspects, the vectorized data comprises data that is produced via a ML-based sentence transformer and the ML-based classifier or regressor comprises a neural network (NN), or the vectorized data comprises n-gram representations and the ML-based classifier or regressor is configured to perform logistic regression on the n-gram representations.

In some aspects, the one or more infrastructure security functions comprise: perform a security scan on the cloud resource, or perform one or more actions to mitigate and/or remediate a vulnerability and/or exploit associated with the cloud resource, or outputting a security report associated with the cloud resource, or any combination thereof.

In an aspect, a non-transitory computer-readable medium storing computer-executable instructions that, when executed by a training component, cause the training component to: receive information samples that characterize attributes of a set of cloud resources of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein each cloud resource of the set of cloud resources is associated with a set of shareable hardware and/or software resources of the backend platform, and wherein each cloud resource of the set of cloud resources is associated with a cloud resource class that corresponds to one of a plurality of cloud resource classes supported by the cloud network; assign resource criticality scores for each cloud resource class associated with the set of cloud resource classes based on the information samples and rule-based heuristics; and train, for each cloud resource class associated with the set of cloud resource classes, a machine-learning (ML)-based classifier or regressor associated with the respective cloud resource class by inputting the information samples and the resource criticality scores for the respective cloud resource class as training data.

In some aspects, the assigning comprises, for each cloud resource of the set of cloud resources: determine a probability distribution of a set of vectorized data attributes associated with the cloud resource associated with the cloud resource class; assign a score to each vectorized data attribute in the set of vectorized data attributes based on the probability distribution; scale each score in accordance with a cloud resource class-specific scaling factor; and normalize each scaled score for each cloud resource class to produce cloud resource class-specific resource criticality scores.

In some aspects, the probability distribution is associated with one or more lookup tables, one or more language tokens, or both.

In some aspects, the ML-based classifier or regressor is trained based on the probability distribution, the set of vectorized data attributes, and the cloud resource class-specific resource criticality scores.

In some aspects, the set of vectorized data attributes is obtained by: pass a first set of information samples in textual form through a ML-based sentence transformer to produce a set of fixed-length text vectors, or transform a second set of information samples into n-gram representations, or a combination thereof.

In some aspects, the set of vectorized data attributes comprises vectorized data that is vectorized from the information samples.

In some aspects, the vectorized data comprises data that is produced via a ML-based sentence transformer and the ML-based classifier or regressor comprises a neural network (NN), or the vectorized data comprises n-gram representations and the ML-based classifier or regressor is configured to perform logistic regression on the n-gram representations.

In some aspects, computer-executable instructions that, when executed by the training component, cause the training component to:

In some aspects, the information samples comprise: cost information, or software information, or purpose information, or security control information, or customer-defined tag information, or component-specific configuration information, or cloud network configuration information, information extracted from an operating system (OS) of the component, or any combination thereof.

In some aspects, the information samples are associated with a JavaScript Object Notation (JSON) configuration file.

In some aspects, at least one cloud resource cloud of the set of cloud resources corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

In some aspects, the cloud network is a public cloud network, a private cloud network, a hybrid cloud network, or a multicloud network.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which:

FIG. 10 illustrates an example distribution lookup table for cloud resources in a cloud resource class, in accordance with an example implementation of the processes of FIGS. 9-10, respectively.

FIG. 11 illustrates an example language tokenizer table for string-based attributes of cloud resources in a cloud resource class, in accordance with an example implementation of the processes of FIGS. 9-10, respectively.

FIGS. 12-15 illustrate example results of processed cloud resource objects, in accordance with aspects of the disclosure.

Figure 1:
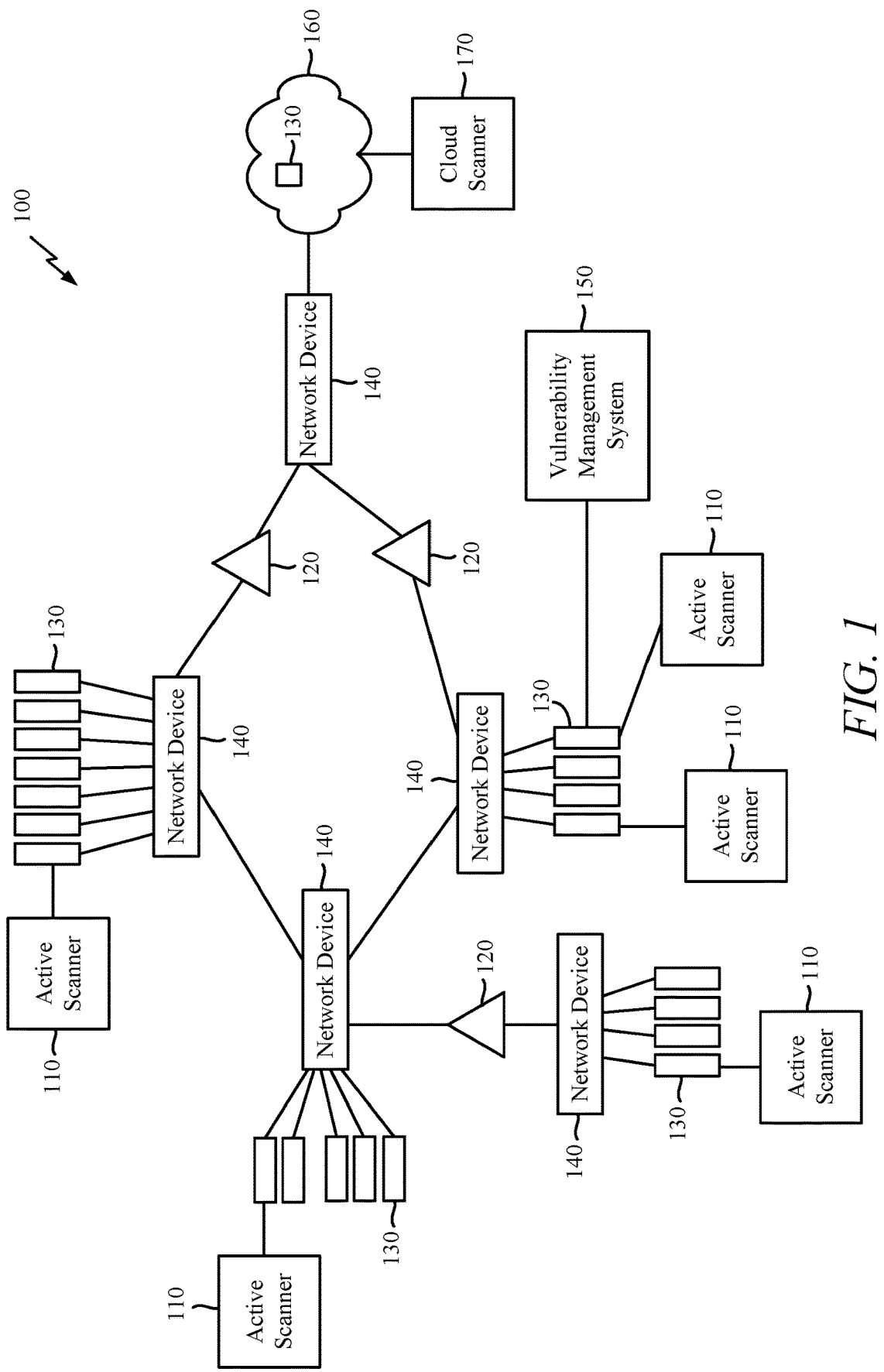
FIG. 1 illustrates an exemplary network having various assets that can be managed using a vulnerability management system, according to various aspects.

The accompanying drawings are presented to aid in the description of various aspects of the disclosure and are provided solely for illustration of the aspects and not limitation thereof.

DETAILED DESCRIPTION

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof. Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes. Further, assets may encompass tangential network aspects such as policies, rules and so forth.

Assets may also be implemented within or as part of cloud network architecture (e.g., cloud assets may correspond to instances or virtual machines (VMs), particular devices or groups of devices, distributed resources across multiple devices and/or locations, etc.) By way of examples, cloud assets may include, but are not limited to, any of the following examples which are characterized with respect to AMAZON, GOOGLE and MICROSOFT cloud services (e.g., Amazon Web Services, Microsoft Azure, Google Cloud), e.g.:

'aws_athena_database'
'aws_db_instance'
'aws_db_snapshot'
'aws_dynamodb_table'
'aws_ecr_repository'
'aws_ecr_repository_policy'
'aws_ecs_cluster'
'aws_ecs_service'
'aws_eks_cluster'
'aws_elb'
'aws_emr_cluster'
'aws_instance'
'aws_nat_gateway'
'aws_rds_cluster'
'aws_rds_cluster_instance'
'aws_redshift_cluster'
'aws_s3_bucket'
'aws_s3_bucket_policy'
'azurerm_container_group'
'azurerm_container_registry'
'azurerm_kubernetes_cluster'
'azurerm_lb'
'azurerm_linux_virtual_machine'
'azurerm_mariadb_server'
'azurerm_mssql_server'
'azurerm_mssql_virtual_machine'
'azurerm_mysql_database'
'azurerm_mysql_server'
'azurerm_postgresql_database'
'azurerm_postgresql_server'
'azurerm_sql_database'
'azurerm_sql_server'
'azurerm_storage_container'
'azurerm_virtual_machine_scale_set'
'azurerm_windows_virtual_machine'
'google_bigquery_dataset'
'google_bigquery_table'
'google_compute_forwarding_rule'
'google_compute_global_forwarding_rule'
'google_compute_instance'
'google_container_cluster'
'google_container_registry'
'google_sql_database'
'google_sql_database_instance'
'google_storage_bucket'
'kubernetes_cluster'
'kubernetes_pod'

According to various aspects, FIG. 1 illustrates an exemplary network 100 having various assets 130 that are interconnected via one or more network devices 140 and managed using a vulnerability management system 150. More particularly, as noted above, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

According to various aspects, the assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations. Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived assets like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

More particularly, the network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. As used herein "credentialed" scans rely upon user credential(s) for authentication. Credentialed scans can perform a wider variety of checks than non-credentialed scans, which can result in more accurate scan results. Non-credentialed scans by contrast do not rely upon user credential(s) for authentication. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent. Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
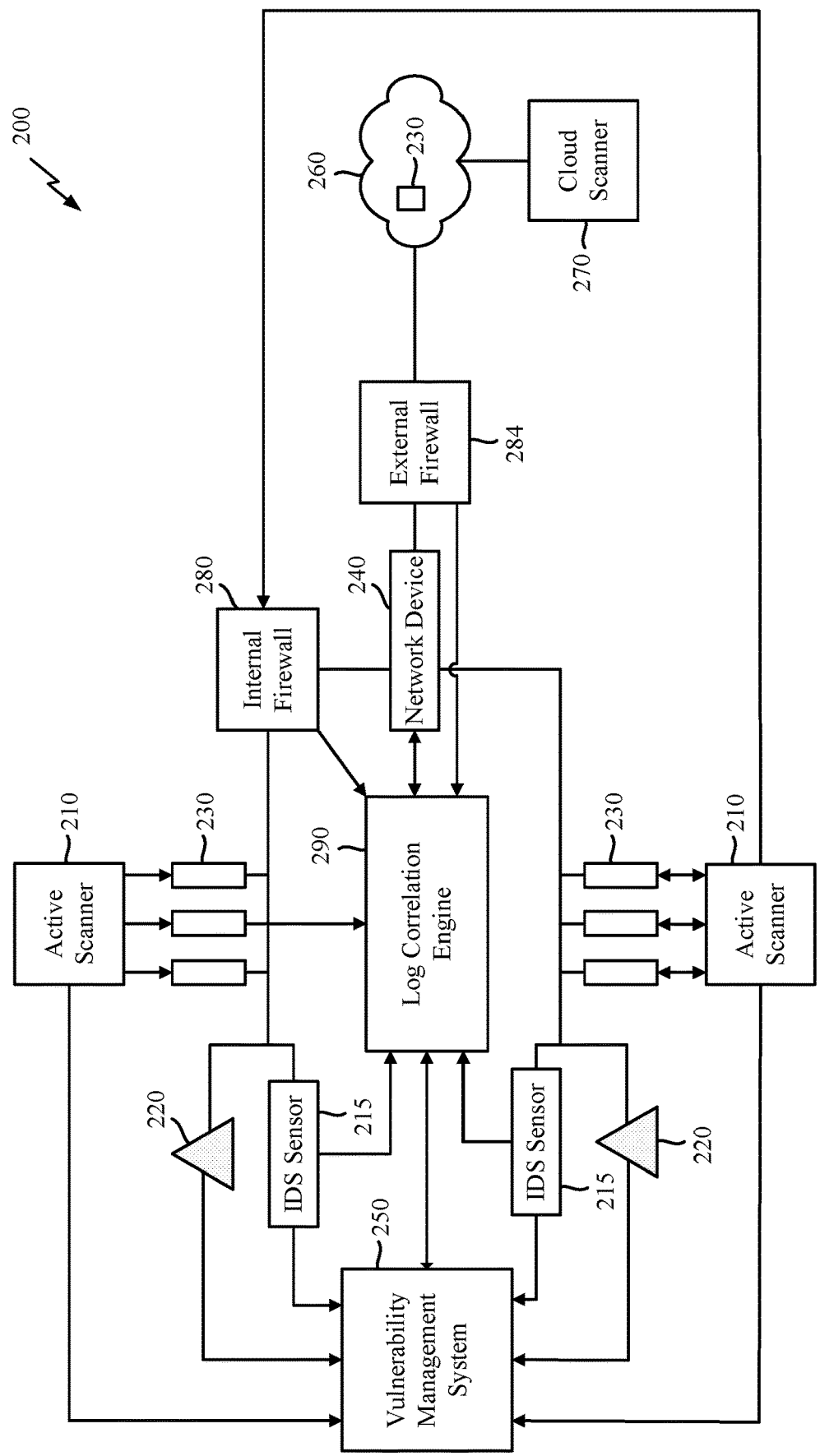
FIG. 2 illustrates another exemplary network having various assets that can be managed using a vulnerability management system, according to various aspects.

According to various aspects, FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain different information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system (IDS) sensor 215 identifies. In one implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In one implementation, the information that the passive scanners 220 obtains from sniffing the traffic traveling across, originating from, or directed to the network 200 may therefore provide a real-time record describing the activity that occurs in the network 200. Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Security auditing applications typically display security issues (such as vulnerabilities, security misconfigurations, weaknesses, etc.) paired with a particular solution for that given issue. Certain security issues may share a given solution, or have solutions which are superseded or otherwise rendered unnecessary by other reported solutions. Embodiments of the disclosure relate to improving an efficiency by which security issues are reported, managed and/or rectified based on solution supersedence.

In accordance with a first embodiment, when working with security reporting datasets with sparse metadata available, the reported solutions for each security issue are combined, and various "rulesets" are applied against the combined solutions to de-duplicate them and remove solutions that have been superseded by other solutions. As used herein, a ruleset is a set of rules that govern when a solution is to be removed or merged with another and how that merge is to be accomplished. In an example, when solution texts not matching a given ruleset are discovered they are flagged for manual review. Examples of rules that may be included in one or more rulesets are as follows:

If there is more than one matching solution in the solution list, remove all but one of those solutions.

For solutions matching "Upgrade to <product> x.y.z" where x, y, and z are integers, select a single result with the highest x.y.z value (comparing against x first, then y, then z).

For solutions matching "Apply fix <fix> to <product>", create a new combined solution where <fix> for each solution is concatenated into a comma separated list for a given <product>.

In accordance with a second embodiment, when working with datasets with metadata available that have an identifier that allows grouping of solutions based on product (e.g., common product enumeration (CPE)) and timestamp information on when a fix has become available, the solutions for each group can be filtered with only display the latest "top level" solution for each group being displayed. In an example, the first and second embodiments can be implemented in conjunction with each other to produce a further refined solution set.

As used herein, a "plug-in" contains logic and metadata for an individual security check in a security auditing application. A plugin may check for one or more mitigations/fixes and flag one or more individual security issues. CPE is a standardized protocol of describing and identifying classes of applications, operating systems, and hardware devices present among an enterprise's computing assets. CPE identifiers contain asset type information (OS/Hardware/Application), vendor, product, and can even contain version information. An example CPE string is "cpe:/o:microsoft:windows_vista:6.0:sp1", where "/o" stands for operating system, Microsoft is the vendor, windows_vista is the product, major version is 6.0, and minor version is SP1. Further, a common vulnerabilities and exposures (CVE) identifier is an identifier from a national database maintained by NIST/Mitre which keeps a list of known vulnerabilities and exposures. An example identifier would be "CVE-2014-6271" which corresponds to the "ShellShock" vulnerability in the database.

In accordance with one implementation of the second embodiment, solutions (or solution 'texts') may first together based on the CPEs in the plugins they were reported in. The solutions are then sorted by the patch publication date from the plugins which they were sourced from. Solutions containing text that matches a pattern that indicates that the solution is likely a patch recommendation can all be removed from the group except the solution associated with the most recent patch. In this manner, patches with identifiers that cannot be easily sorted (e.g., patches with non-numerical identifiers) and/or for which no ruleset pertains in accordance with the first embodiment can be filtered out from the solution set. In some implementations, additional ruleset-based filtering from the first embodiment can also be applied, to filter out (or de-duplicate) additional duplicate solution information.

In accordance with a third embodiment, a security auditing application may evaluate further metadata in the solution report results that is added based upon asset-specific information (e.g., such as individual patches installed, which mitigations and patches are missing, what individual software installations are installed, patch supersedence information, the relationship between the mitigations/patches and security issues, etc.).

Web applications can be an essential way to conduct business. Unfortunately, web applications can also be vulnerable to attacks (e.g., denial of service, disclosure of private information, network infiltration, etc.) due to their exposure to public internet. Thus, addressing vulnerabilities before an attacker can exploit them is a high priority. Web application scanning (WAS) can be performed to identify vulnerabilities associated with web applications. For example, a web application scanner (or simply "scanner") may be used to scan externally accessible website page for vulnerable web applications.

WAS scans may take a relatively long time to perform, and many scans of redundant web pages or substantially redundant web pages may be performed. For example, a newly scanned web page may include only altered content (e.g., text, images, video, etc.) without any functional alterations, making that scan redundant.

When crawling a web application, a large number of web pages are discovered. Hence, deciding which of these web pages to audit via a security audit scan, and which will provide little to no benefit in auditing via the security audit scan, may help to reduce WAS scan times.

Figure 3:
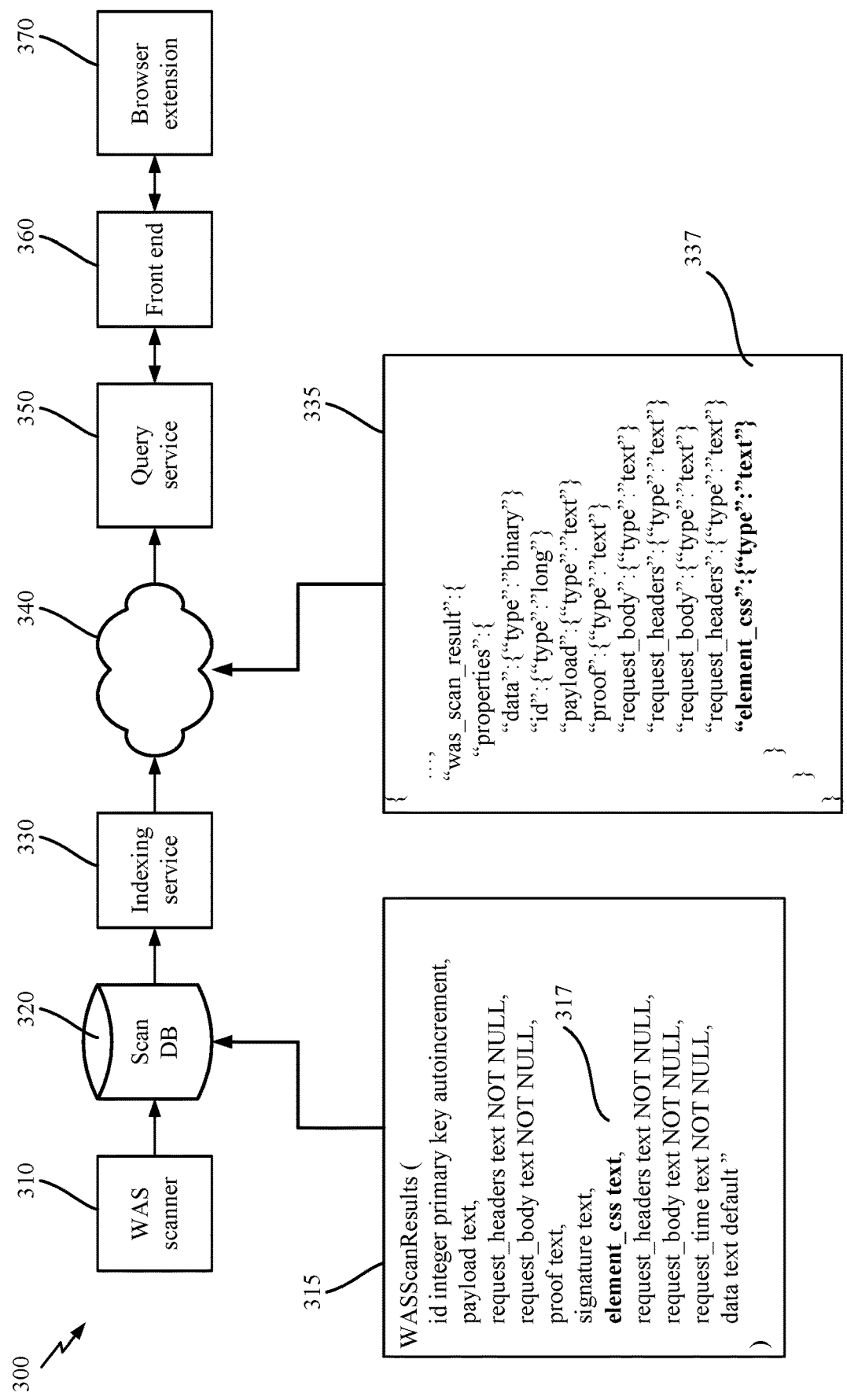
FIG. 3 illustrates a diagram of an example system suitable for interactive remediation of vulnerabilities of web applications based on scanning of web applications.

According to various aspects, FIG. 3 illustrates a diagram of an example system 300 suitable for interactive remediation of vulnerabilities of web applications based on scanning of web applications. In particular, as shown in FIG. 3, the system 300 may include a WAS scanner (or simply "scanner") 310, a scan results 320 (e.g., a database (DB)), a first cloud service 330, a search engine 340, a second cloud service 350, a front end 360, and a browser extension 370. The first and second cloud services 330, 350 may be a same cloud service or different cloud services.

Generally, the scanner 310 may include an element selector for the vulnerable element as a part of its result placed into the scan results 320. Examples (not necessarily exhaustive) of an element selector may include CSS selector, XPath selector, Node number selector, Name selector, Id selector, LinkText selector, and so on. This information may then be passed into the search engine 340 by the first cloud service 330 and included in results from the second cloud service 350 when queried for data about specific vulnerabilities, e.g., from the front end 360. If an element selector exists, the front end 360 (e.g., browser) may include a button that links back to the vulnerable URL and element.

The scanner 310 may be configured to scan web pages to identify one or more vulnerabilities of web applications, i.e., vulnerabilities of elements in web pages. In particular, the scanner 310 may include a selector (not shown) for the vulnerable element in the scan results 320. For example, the selector may implement a scanner function (selector create function) that will take the current element and produce an element selector from it. The URL the element appears on may be included as separate data. A final test may be run before including the data to ensure that the element can be gotten to or otherwise accessible without any extra browser steps that the system is unaware of. Such data may be kept in a table in the scan results 320. For example, FIG. 3 illustrates a VulnerabilitiesDetected table 315, which includes a field for an element selector 317 denoted as "element_css", which is of text type.

The first cloud service 330 may be configured to index the search results within scan results 320. In particular, the first cloud service 330 may be configured to ensure that the field for the element selector 317 is included when the search engine 340 performs a search. In FIG. 3, it is seen the "was_scan_results" 335 data includes the element selector data 337, which is denoted as "element_css":{"type": "text"}.

The second cloud service 350 may be configured to query the search engine 340 for results of WAS scanning, e.g., performed by the scanner 310. In particular, the second cloud service 350 may be configured to query the search engine 340 for the element selector data 337. For example, the second cloud service 350 may submit the following query to pick up the element selector data 337 and return its response, e.g., to the front end 360.

GET/scans/{scanId}/hosts/{hostId}/plugins/{pluginId}

The front end 360 may be configured to receive the WAS scanning results data, including the element selector data for the vulnerable elements. The front end 360 may also be configured to include a button or some other visible element, which when activated (e.g., pressed by a user) will pass message to the browser extension 370 (e.g., chrome extension). The front end 360 may pass at least the following data in the message to the browser extension 370:

URL
Element selector
Plugin ID

The browser extension 370 may be configured to take the message passed from the front end 360, open the URL, and highlight and snap to the vulnerable element. In an aspect, the browser extension 370 may open the URL in a new tab of the browser.

Figure 4:
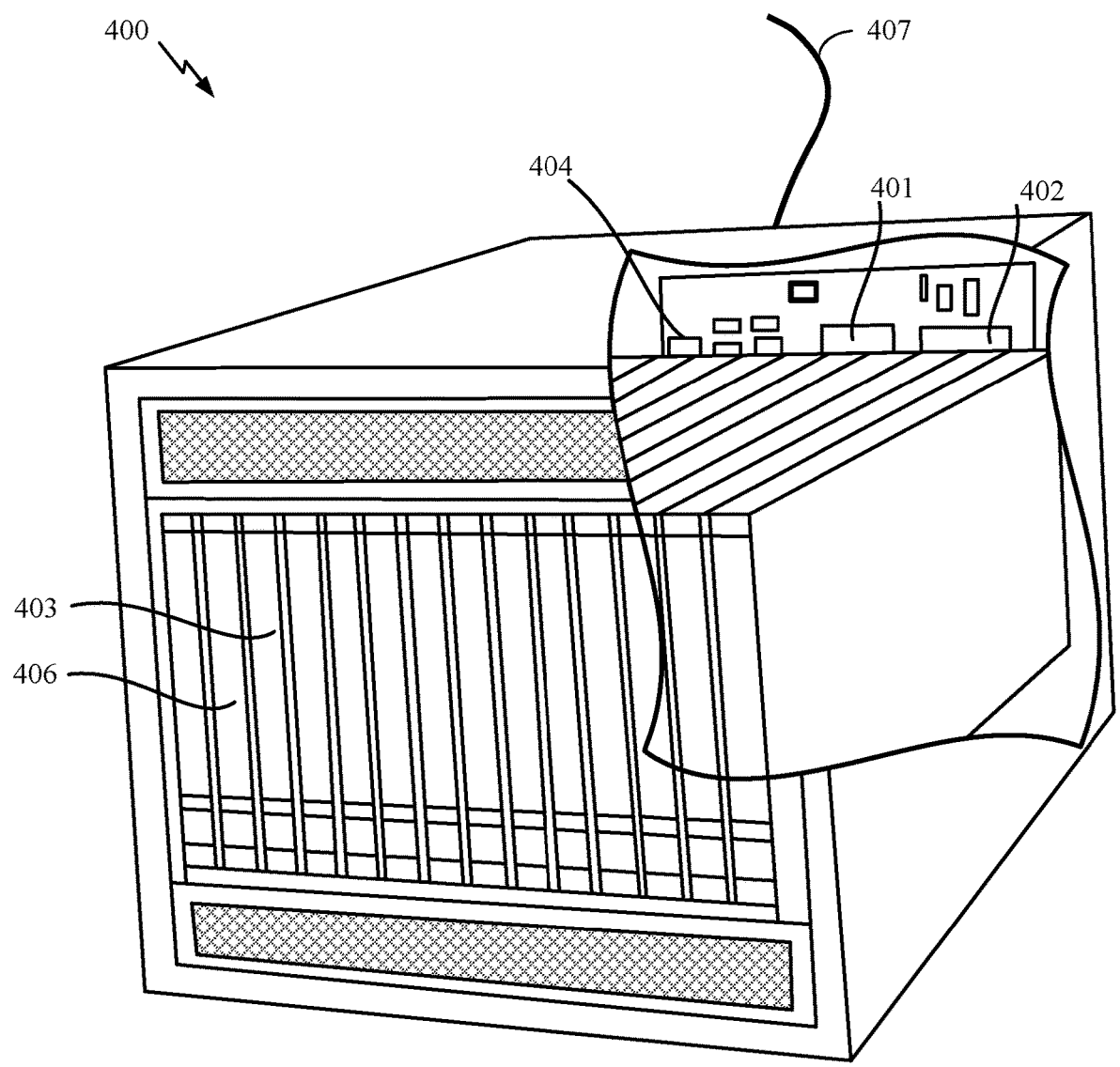
FIG. 4 illustrates a server, according to aspects of the disclosure.

The various embodiments may be implemented on any of a variety of commercially available server devices, such as server 400 illustrated in FIG. 4. In an example, the server 400 may correspond to one example configuration of a server on which a security auditing application may execute, which in certain implementations may be included as part of the vulnerability management system 150 of FIG. 1 or the vulnerability management system 250 of FIG. 2 or WAS scanner 300 of FIG. 3. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet.

Figure 5:
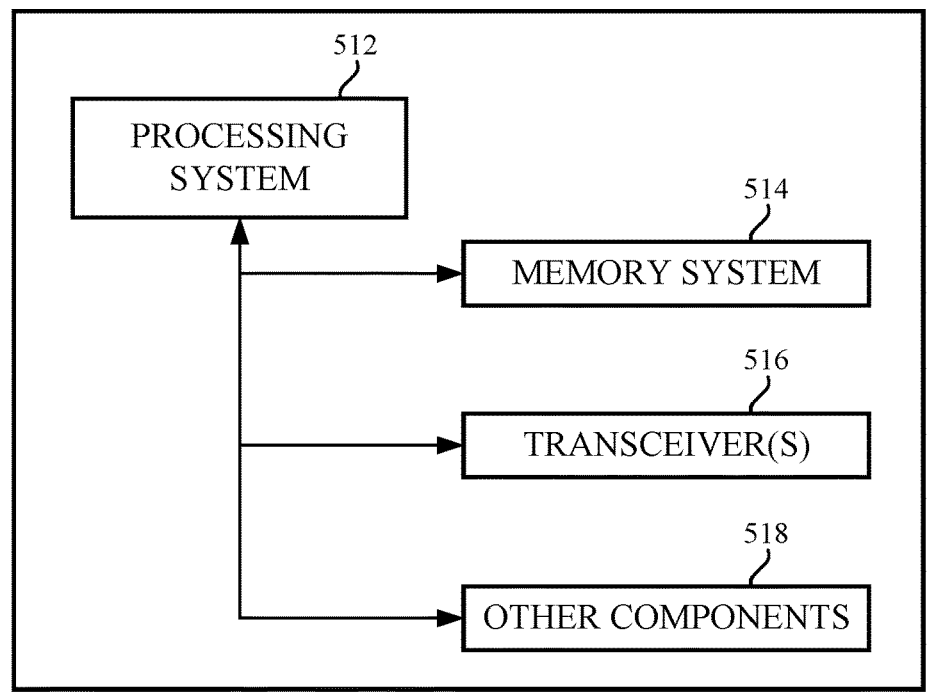
FIG. 5 generally illustrates a user equipment (UE) in accordance with aspects of the disclosure.

While FIG. 4 illustrates an example whereby a server-type apparatus 400 may implement various processes of the disclosure, in other aspects various aspects of the disclosure may execute on a user equipment (UE), such as UE 510 depicted in FIG. 5.

FIG. 5 generally illustrates a UE 510 in accordance with aspects of the disclosure. In some designs, UE 510 may correspond to any UE-type that is capable of executing the process(es) in accordance with aspects of the disclosure, including but not limited to a mobile phone or tablet computer, a laptop computer, a desktop computer, a wearable device (e.g., smart watch, etc.), and so on. The UE 510 depicted in FIG. 5 includes a processing system 512, a memory system 514, and at least one transceiver 516. The UE 510 may optionally include other components 518 (e.g., a graphics card, various communication ports, etc.).

Machine learning may be used to generate models that may be used to facilitate various aspects associated with processing of data. One specific application of machine learning relates to generation of measurement models for processing of reference signals for positioning (e.g., positioning reference signal (PRS)), such as feature extraction, reporting of reference signal measurements (e.g., selecting which extracted features to report), and so on.

Machine learning models are generally categorized as either supervised or unsupervised. A supervised model may further be sub-categorized as either a regression or classification model. Supervised learning involves learning a function that maps an input to an output based on example input-output pairs. For example, given a training dataset with two variables of age (input) and height (output), a supervised learning model could be generated to predict the height of a person based on their age. In regression models, the output is continuous. One example of a regression model is a linear regression, which simply attempts to find a line that best fits the data. Extensions of linear regression include multiple linear regression (e.g., finding a plane of best fit) and polynomial regression (e.g., finding a curve of best fit).

Another example of a machine learning model is a decision tree model. In a decision tree model, a tree structure is defined with a plurality of nodes. Decisions are used to move from a root node at the top of the decision tree to a leaf node at the bottom of the decision tree (i.e., a node with no further child nodes). Generally, a higher number of nodes in the decision tree model is correlated with higher decision accuracy.

Another example of a machine learning model is a decision forest. Random forests are an ensemble learning technique that builds off of decision trees. Random forests involve creating multiple decision trees using bootstrapped datasets of the original data and randomly selecting a subset of variables at each step of the decision tree. The model then selects the mode of all of the predictions of each decision tree. By relying on a "majority wins" model, the risk of error from an individual tree is reduced.

Another example of a machine learning model is a neural network (NN). A neural network is essentially a network of mathematical equations. Neural networks accept one or more input variables, and by going through a network of equations, result in one or more output variables. Put another way, a neural network takes in a vector of inputs and returns a vector of outputs.

Figure 6:
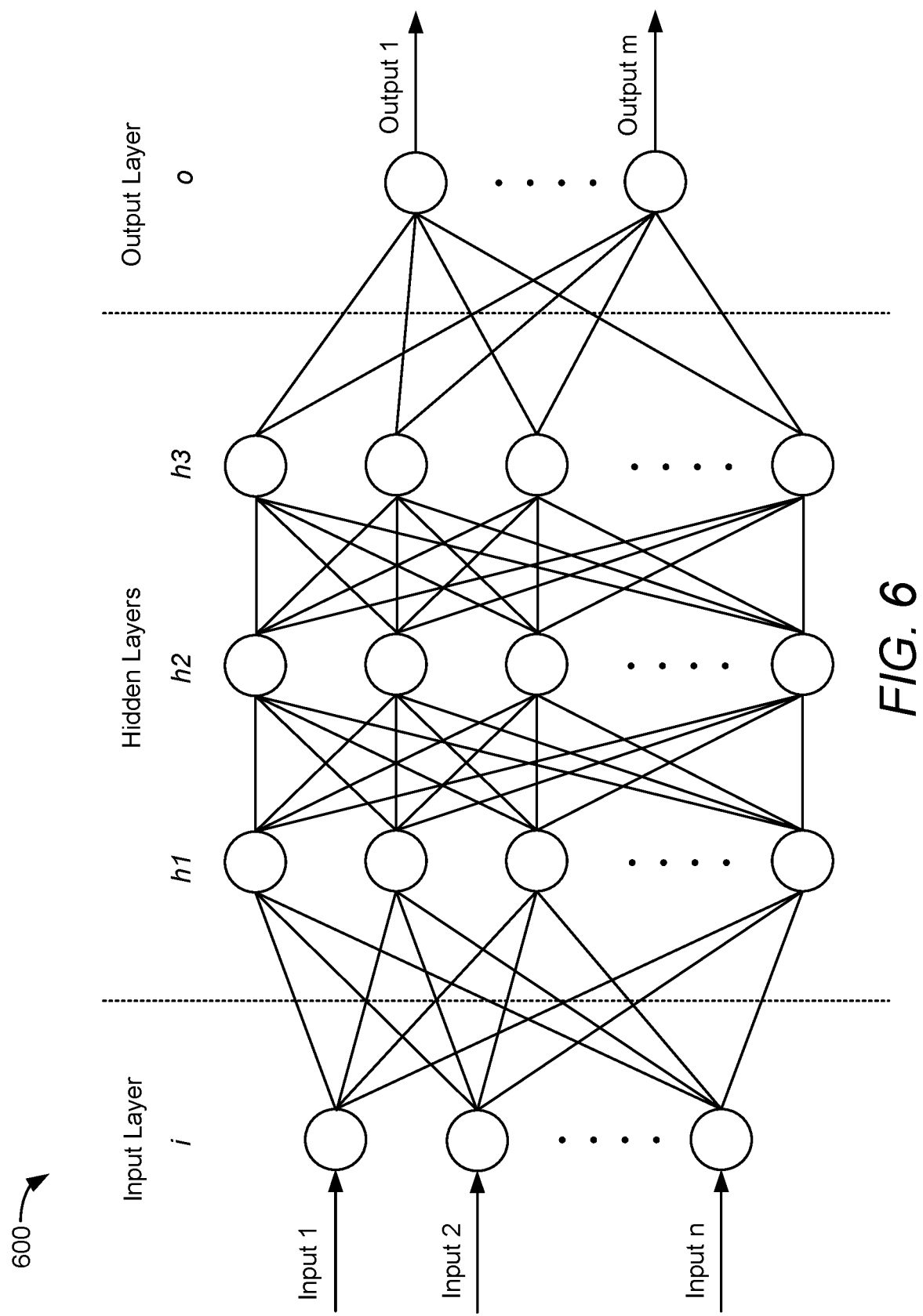
FIG. 6 illustrates an example neural network, according to aspects of the disclosure.

FIG. 6 illustrates an example neural network 600, according to aspects of the disclosure. The neural network 600 includes an input layer 'i' that receives 'n' (one or more) inputs (illustrated as "Input 1," "Input 2," and "Input n"), one or more hidden layers (illustrated as hidden layers 'h1,' 'h2,' and 'h3') for processing the inputs from the input layer, and an output layer 'o' that provides 'm' (one or more) outputs (labeled "Output 1" and "Output m"). The number of inputs 'n,' hidden layers 'h,' and outputs 'm' may be the same or different. In some designs, the hidden layers 'h' may include linear function(s) and/or activation function(s) that the nodes (illustrated as circles) of each successive hidden layer process from the nodes of the previous hidden layer.

In classification models, the output is discrete. One example of a classification model is logistic regression. Logistic regression is similar to linear regression but is used to model the probability of a finite number of outcomes, typically two. In essence, a logistic equation is created in such a way that the output values can only be between '0' and '1.' Another example of a classification model is a support vector machine. For example, for two classes of data, a support vector machine will find a hyperplane or a boundary between the two classes of data that maximizes the margin between the two classes. There are many planes that can separate the two classes, but only one plane can maximize the margin or distance between the classes. Another example of a classification model is Naïve Bayes, which is based on Bayes Theorem. Other examples of classification models include decision tree, random forest, and neural network, similar to the examples described above except that the output is discrete rather than continuous.

Unlike supervised learning, unsupervised learning is used to draw inferences and find patterns from input data without references to labeled outcomes. Two examples of unsupervised learning models include clustering and dimensionality reduction.

Clustering is an unsupervised technique that involves the grouping, or clustering, of data points. Clustering is frequently used for customer segmentation, fraud detection, and document classification. Common clustering techniques include k-means clustering, hierarchical clustering, mean shift clustering, and density-based clustering. Dimensionality reduction is the process of reducing the number of random variables under consideration by obtaining a set of principal variables. In simpler terms, dimensionality reduction is the process of reducing the dimension of a feature set (in even simpler terms, reducing the number of features). Most dimensionality reduction techniques can be categorized as either feature elimination or feature extraction. One example of dimensionality reduction is called principal component analysis (PCA). In the simplest sense, PCA involves project higher dimensional data (e.g., three dimensions) to a smaller space (e.g., two dimensions). This results in a lower dimension of data (e.g., two dimensions instead of three dimensions) while keeping all original variables in the model.

Regardless of which machine learning model is used, at a high-level, a machine learning module (e.g., implemented by a processing system) may be configured to iteratively analyze training input data (e.g., measurements of reference signals to/from various target UEs) and to associate this training input data with an output data set (e.g., a set of possible or likely candidate locations of the various target UEs), thereby enabling later determination of the same output data set when presented with similar input data (e.g., from other target UEs at the same or similar location).

Figure 7:
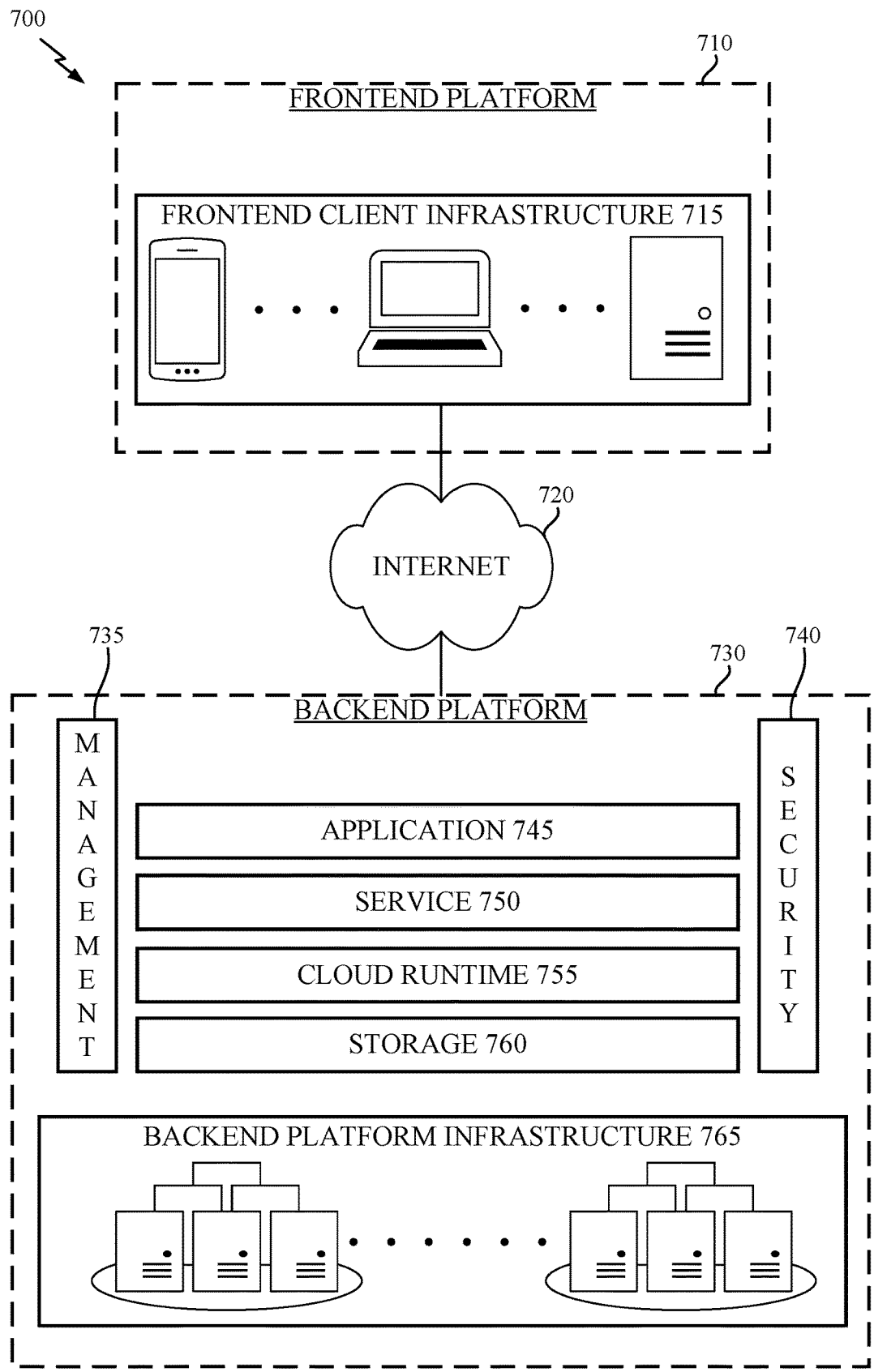
FIG. 7 illustrates cloud network architecture, in accordance with aspects of the disclosure.

FIG. 7 illustrates cloud network architecture 700, in accordance with aspects of the disclosure. The cloud network architecture 700 comprises a frontend platform 710, an Internet 720, and a backend platform 730. The frontend platform 710 comprises frontend client infrastructure 715, such as smartphones, laptop or desktop computers, and so on, for interfacing with clients (e.g., via web browsers, client applications, etc.). The backend platform 730 comprises a management function 735, a security function 740, an application function 745, a service function 750, a cloud runtime function 755, storage 760 and backend platform infrastructure 765 (e.g., a group of distributed and interconnected computing devices with shareable hardware and/or software resources that support distributed implementation of a set of cloud applications via a respective set of cloud resources).

Referring to FIG. 7, in cloud architecture, each of the components works together to create a cloud computing platform that provides users with on-demand access to resources and services. The backend platform 730 contains all the cloud computing resources, services 750, data storage 760, and applications 745 offered by a cloud service provider. A network, such as Internet 720, is used to connect the frontend platform 710 and backend cloud architecture components of the backend platform 730, facilitating data to be sent back and forth between them. When users interact with the frontend platform (or client-side interface), the user devices send queries to the backend platform 730 using middleware where the service model carries out the specific task or request.

The types of services available to use vary depending on the cloud-based delivery model or service model you have chosen. In some designs, there are three main cloud computing service models, e.g.:

Infrastructure as a service (IaaS): This model provides on-demand access to cloud infrastructure, such as servers, storage, and networking. This eliminates the need to procure, manage, and maintain on-premises infrastructure.

Platform as a service (PaaS): This model offers a computing platform with all the underlying infrastructure and software tools needed to develop, run, and manage applications.

Software as a service (SaaS): This model offers cloud-based applications that are delivered and maintained by the service provider, eliminating the need for end users to deploy software locally.

In some designs, cloud architecture may also be characterized in terms of cloud architecture layers, e.g.:

Hardware: The servers, storage, network devices, and other hardware that power the cloud.

Virtualization: An abstraction layer that creates a virtual representation of physical computing and storage resources. This allows multiple applications to use the same resources.

Application and service: This layer coordinates and supports requests from the frontend user interface, offering different services based on the cloud service model, from resource allocation to application development tools to web-based applications.

In some designs, various types of cloud architecture may be implemented, e.g.:

Public cloud architecture uses cloud computing resources and physical infrastructure that is owned and operated by a third-party cloud service provider. Public clouds enable you to scale resources easily without having to invest in your own hardware or software, but use multi-tenant architectures that serve other customers at the same time.

Private cloud architecture refers to a dedicated cloud that is owned and managed by your organization. It is privately hosted on-premises in your own data center, providing more control over resources and more security over data and infrastructure. However, this architecture is considerably more expensive and requires more IT expertise to maintain.

Hybrid cloud architecture uses both public and private cloud architecture to deliver a flexible mix of cloud services. A hybrid cloud allows you to migrate workloads between environments, allowing you to use the services that best suit your business demands and the workload. Hybrid cloud architectures are often the solution of choice for businesses that need control over their data but also want to take advantage of public cloud offerings.

Multicloud architecture uses cloud services from multiple cloud providers. Multicloud environments are gaining popularity for their flexibility and ability to better match use cases to specific offerings, regardless of vendor.

In some designs, components of cloud architecture include:

Virtualization: Clouds are built upon the virtualization of servers, storage, and networks. Virtualized resources are a software-based, or virtual, representation of a physical resource such as servers or storage. This abstraction layer facilitates multiple applications to utilize the same physical resources, thereby increasing the efficiency of servers, storage, and networking throughout the enterprise.

Infrastructure: loud infrastructure includes all the components of traditional data centers including servers, persistent storage, and networking gear including routers and switches.

Middleware: As in traditional data centers, these software components such as databases and communications applications enable networked computers, applications, and software to communicate with each other.

Management: These tools enable continuous monitoring of a cloud environment's performance and capacity. IT teams can track usage, deploy new apps, integrate data, and ensure disaster recovery, all from a single console.

Automation software: The delivery of critical IT services through automation and predefined policies can significantly ease IT workloads, streamline application delivery, and reduce costs. In cloud architecture, automation is used to easily scale up system resources to accommodate a spike in demand for compute power, deploy applications to meet fluctuating market demands, or ensure governance across a cloud environment.

An asset criticality rating (ACR) rates the criticality of an asset to an organization. In some designs, an asset's ACR is expressed as an integer from 1 to 10, with higher values corresponding to the asset being more critical to the business. In some designs, ACR for user and computer accounts using a rule-based system. In some designs, rules fall into three broad categories depending on the properties evaluated, e.g.:

Capabilities: Represents an objects capabilities within Tenable Identity Exposure. This is inferred from various properties of the asset. For example, a KRBTGT account or managed service account receives a high capability score.

Group Permissions: Assets can have greater or lower levels of permissions depending on the groups of which they are members. In particular, administrative groups and groups that have write access to other important objects. Examples of groups are DomainAdmins, DomainUsers, Administrators, and BackupOperators.

Object Type: Looks at the user account control attribute of the object to score it. If the attribute contains one or more of the listed values (normal, disable, workstation, server, interdomain), then Tenable Identity Exposure assigns the asset a score.

The above-noted ACR aspects generally relate to network assets that are directly owned by an enterprise and directly controlled by a network administrator.

Modern organizations are increasingly preferring to rent resources from cloud-based service providers (or cloud provider) instead of purchasing, maintaining and managing them directly. This approach has a number of benefits, such as delegating the costs of hardware disposal to the cloud provider, flexibility in configuration changes, adaptability to business needs, and ease of obtaining new resources. These factors have led to the rapid growth of many organizations' cloud-based infrastructure. However, these cloud resources have become difficult to manage for a single system administrator, as such cloud resources often span multiple internal organizations and teams.

Furthermore, cloud infrastructure significantly expands the attack surface, as any of its parts may potentially become infected with malicious code or vulnerable software at any time. This necessitates quick detection of cloud resources that have the most significant impact on a given organization's business. This value will also ideally be explainable to understand the scope and reasons behind such a verdict.

Cloud resources are assigned by cloud providers to their customers, and typically include some combination of cloud hardware and/or source attributes allocated for a particular task or application. Examples of cloud resources include virtual machines, databases, web servers, and email services. These components are often critical for businesses that use them. However, when dealing with hundreds or thousands of such cloud resources, it may not be obvious for the owner to understand which ones are critical to operate.

In contrast to network asset ACR calculation, in some vulnerability management systems, cloud resources are typically assigned a criticality default score in accordance via a simple rule-based methodology that is based on their cloud resource categorization (e.g., assign all Amazon EC2 instances, Google or Azure virtual machines (VMs), etc., a criticality score of "3", etc.).

Aspects of the disclosure are directed to assigning criticality scores to cloud resources based on vectorized attribute data associated with the cloud resources in conjunction with cloud resource class-specific ML-based classifier or regressors. In particular, the cloud resource class-specific ML-based classifier or regressors may be trained based on training data associated with cloud resources in a respective cloud resource class. Such aspects may provide various technical advantages, such as more precise cloud resource criticality ratings, which may in turn improve various security aspects associated with the associated cloud resources.

Figure 8:
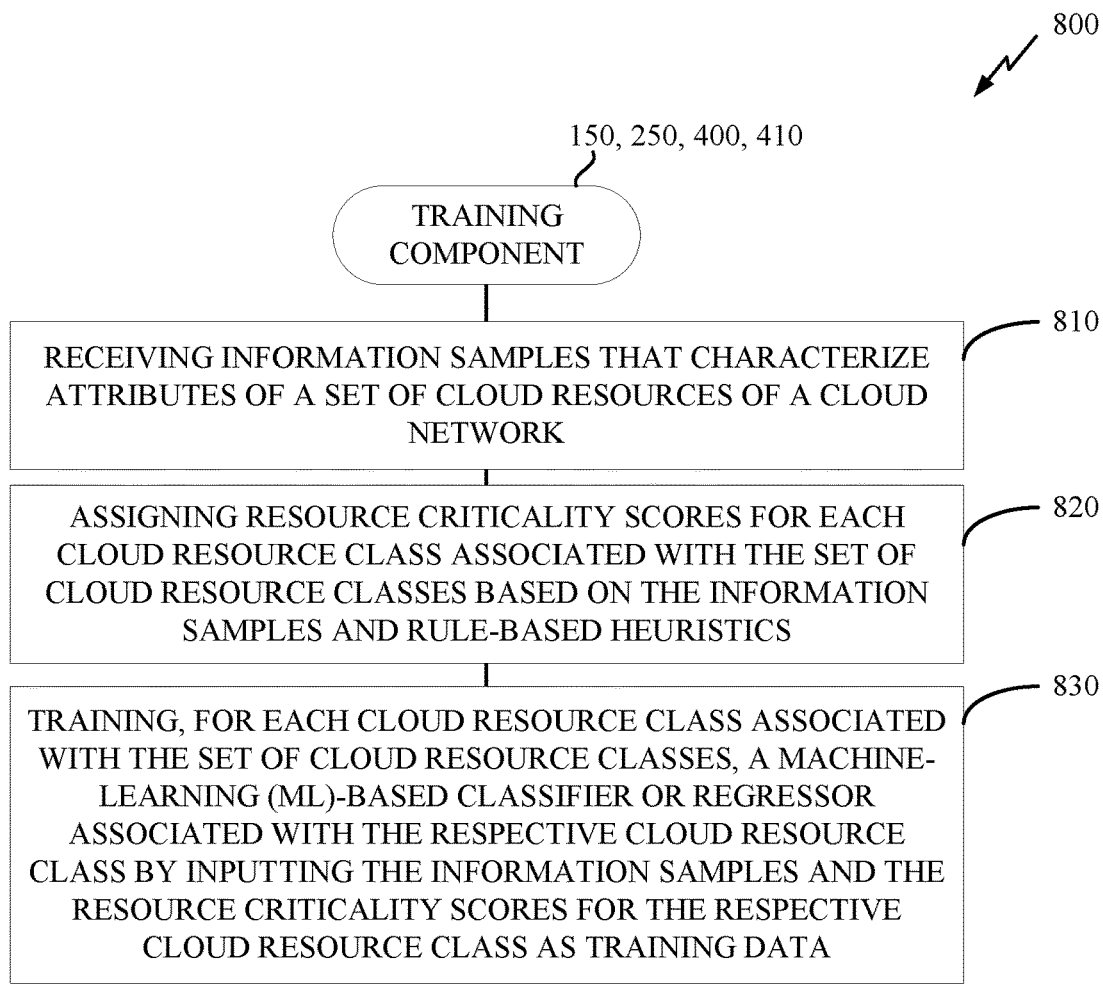
FIG. 8 illustrates a process, in accordance with aspects of the disclosure.

FIG. 8 illustrates a process 800, in accordance with aspects of the disclosure. The process 800 of FIG. 8 may be performed by a training component, such as vulnerability management system 150, vulnerability management system 250, server 400 or UE 510.

Referring to FIG. 8, at 810, the training component (e.g., network access ports 404, transceiver(s) 516, etc.) receives information samples that characterize attributes of a set of cloud resources of a cloud network. In an aspect, the cloud network comprises a frontend platform and a backend platform. In an aspect, the frontend platform comprises frontend client infrastructure for interfacing with clients. In an aspect, the backend platform comprises backend platform infrastructure that comprises a group of distributed and interconnected computing devices with shareable hardware and/or software resources that support distributed implementation of a set of cloud applications via a respective set of cloud resources. In an aspect, the cloud resource is associated with a set of shareable hardware and/or software resources of the backend platform. In an aspect, the cloud resource is associated with a cloud resource class that corresponds to one of a plurality of cloud resource classes supported by the cloud network.

Referring to FIG. 8, at 820, the training component (e.g., processor(s) 401, processing system 512, etc.) assigns resource criticality scores for each cloud resource class associated with the set of cloud resource classes based on the information samples and rule-based heuristics.

Referring to FIG. 8, at 830, the training component (e.g., processor(s) 401, processing system 512, etc.) trains, for each cloud resource class associated with the set of cloud resource classes, a machine-learning (ML)-based classifier or regressor associated with the respective cloud resource class by inputting the information samples and the resource criticality scores for the respective cloud resource class as training data.

Referring to FIG. 8, in some designs, the assigning of 820 comprises, for each cloud resource of the set of cloud resources, e.g.:
 determining a probability distribution of a set of vectorized data attributes associated with the cloud resource associated with the cloud resource class;
 assigning a score to each vectorized data attribute in the set of vectorized data attributes based on the probability distribution;
 scaling each score in accordance with a cloud resource class-specific scaling factor; and
 normalizing each scaled score for each cloud resource class to produce cloud resource class-specific resource criticality scores.

Referring to FIG. 8, in some designs, the probability distribution is associated with one or more lookup tables, one or more language tokens, or both. In some designs, the ML-based classifier or regressor is trained based on the probability distribution, the set of vectorized data attributes, and the cloud resource class-specific resource criticality scores. In some designs, the set of vectorized data attributes is obtained by:
 passing a first set of information samples in textual form through a ML-based sentence transformer to produce a set of fixed-length text vectors, or
 transforming a second set of information samples into n-gram representations, or
 a combination thereof.

Referring to FIG. 8, in some designs, the set of vectorized data attributes comprises vectorized data that is vectorized from the information samples. In an aspect, the vectorized data comprises data that is produced via a ML-based sentence transformer and the ML-based classifier or regressor comprises a neural network (NN), or the vectorized data comprises n-gram representations and the ML-based classifier or regressor is configured to perform logistic regression on the n-gram representations.

Referring to FIG. 8, in some designs, the training component further refines, for at least one cloud resource class associated with the set of cloud resource classes, the ML-based classifier or regressor associated with the at least one cloud resource class by inputting new information samples and new resource criticality scores for the at least one cloud resource class as new training data.

Referring to FIG. 8, in some designs, the information samples comprise:
 cost information, or
 software information, or
 purpose information, or
 security control information, or
 customer-defined tag information, or
 component-specific configuration information, or
 cloud network configuration information,
 information extracted from an operating system (OS) of the component, or
 any combination thereof.

In a specific example, cloud resources (or assets) may be mapped to higher level categories of exposure based on the resource type and features (properties) extracted from cloud resource configuration data:
 Access Exposure
 Key/Data Exposure
 Private/Internal Exposure
 Public Exposure
 VPC Misconfiguration
 Potential Vulnerabilities Referring to FIG. 8, in some designs, the information samples are associated with a JavaScript Object Notation (JSON) configuration file.

Referring to FIG. 8, in some designs, at least one cloud resource cloud of the set of cloud resources corresponds to:
 an Azure virtual machine, or
 an Amazon Web Services (AWS) instance, or
 a Google Cloud Processing (GCP) instance, or
 a relational database (RDB), or
 a storage bucket or storage container, or
 a billable resource type, or
 a combination thereof.

Referring to FIG. 8, in some designs, the cloud network is a public cloud network, a private cloud network, a hybrid cloud network, or a multicloud network.

Figure 9:
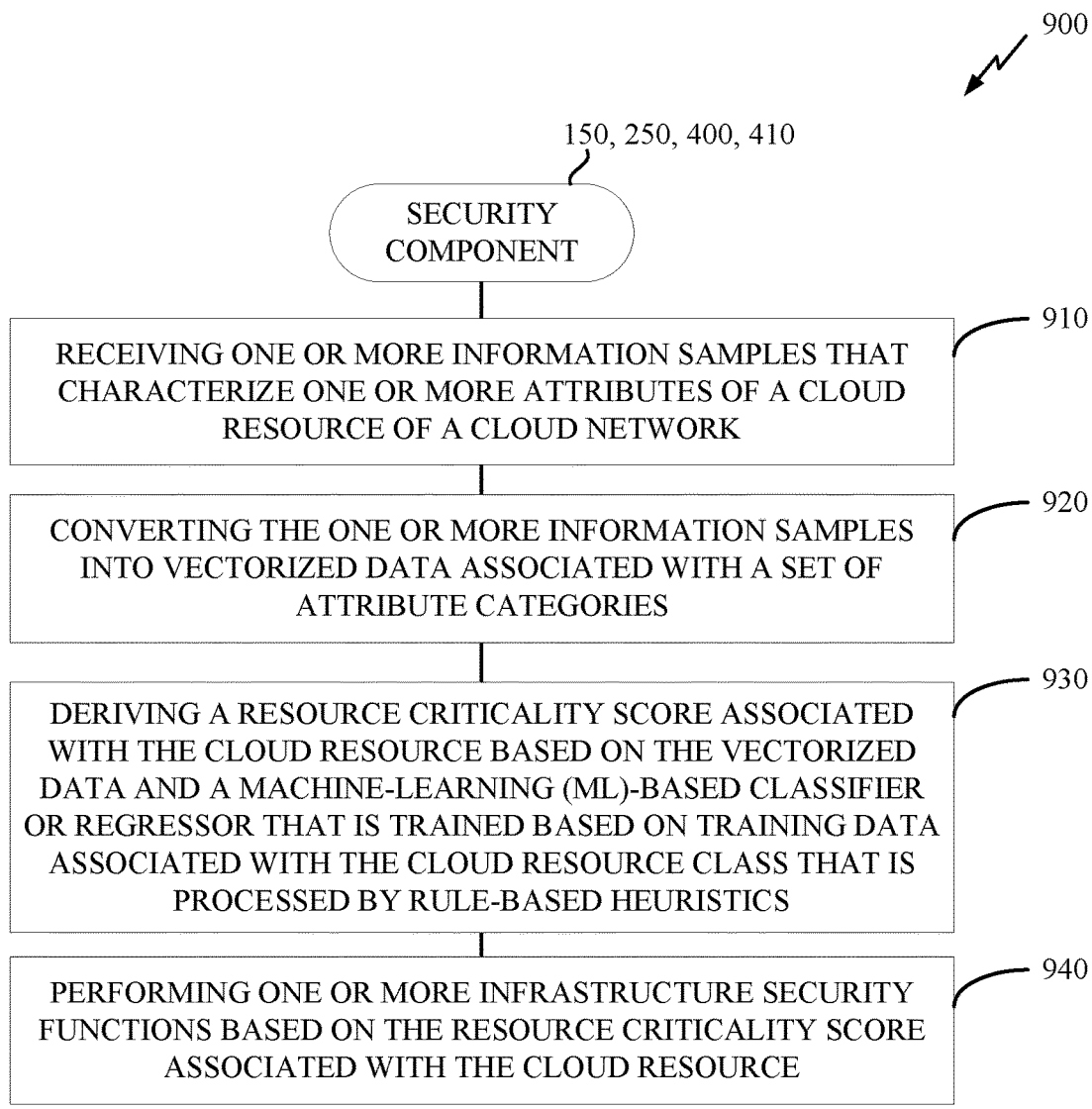
FIG. 9 illustrates a process, in accordance with aspects of the disclosure.

FIG. 9 illustrates a process 900, in accordance with aspects of the disclosure. The process 900 of FIG. 9 may be performed by a security component, such as vulnerability management system 150, vulnerability management system 250, server 400 or UE 510. Note that the security component that performs the process 800 of FIG. 9 need not be the same as the security component that performs the process 900 of FIG. 9, although this is possible.

Referring to FIG. 9, at 910, the security component (e.g., network access ports 404, transceiver(s) 516, etc.) receives one or more information samples that characterize one or more attributes of a cloud resource of a cloud network. In an aspect, the cloud network comprises a frontend platform and a backend platform. In an aspect, the frontend platform comprises frontend client infrastructure for interfacing with clients. In an aspect, the backend platform comprises backend platform infrastructure that comprises a group of distributed and interconnected computing devices with shareable hardware and/or software resources that support distributed implementation of a set of cloud applications via a respective set of cloud resources. In an aspect, the cloud resource is associated with a set of shareable hardware and/or software resources of the backend platform. In an aspect, the cloud resource is associated with a cloud resource class that corresponds to one of a plurality of cloud resource classes supported by the cloud network.

Referring to FIG. 9, at 920, the security component (e.g., processor(s) 401, processing system 512, etc.) converts the one or more information samples into vectorized data associated with a set of attribute categories.

Referring to FIG. 9, at 930, the security component (e.g., processor(s) 401, processing system 512, etc.) derives a resource criticality score associated with the cloud resource based on the vectorized data and a machine-learning (ML)-based classifier or regressor that is trained based on training data associated with the cloud resource class that is processed by rule-based heuristics.

Referring to FIG. 9, at 940, the security component (e.g., processor(s) 401, processing system 512, network access ports 404, transceiver(s) 516, etc.) performs one or more infrastructure security functions based on the resource criticality score associated with the cloud resource. Note that as used herein, the aforementioned infrastructure security function(s) refer generally to operations that protect the cloud resource inside of the cloud network, as opposed to protection of content downloaded from and used outside of the cloud network (e.g., such as copyright protection schemes, etc.).

Referring to FIG. 9, in some designs, the one or more information samples comprise, e.g.:
cost information, or
software information, or
purpose information, or
security control information, or
customer-defined tag information, or
component-specific configuration information, or
cloud network configuration information,
information extracted from an operating system (OS) of the component, or
any combination thereof.

Referring to FIG. 9, in some designs, the one or more information samples are associated with a JavaScript Object Notation (JSON) configuration file.

Referring to FIG. 9, in some designs, the cloud resource class corresponds to, e.g.:
an Azure virtual machine, or
an Amazon Web Services (AWS) instance, or
a Google Cloud Processing (GCP) instance, or
a relational database (RDB), or
a storage bucket or storage container, or
a billable resource type, or
a combination thereof.

Referring to FIG. 9, in some designs, the cloud network is a public cloud network, a private cloud network, a hybrid cloud network, or a multicloud network.

Referring to FIG. 9, in some designs, the rule-based heuristics associated with the cloud resource class comprise:
determining a probability distribution of a set of vectorized data attributes associated with a training cloud resource associated with the cloud resource class;
assigning a score to each vectorized data attribute in the set of vectorized data attributes based on the probability distribution;
scaling each score in accordance with a cloud resource class-specific scaling factor, and
normalizing each scaled score for each cloud resource class to produce cloud resource class-specific resource criticality scores.

Referring to FIG. 9, in some designs, the above-noted probability distribution may be aggregated for a specific cloud resource (e.g., AWS resource), and then separately aggregated for a group of cloud resources for the cloud resource class (e.g., an AWS bucket). In some designs, the probability distribution is associated with one or more lookup tables, one or more language tokens, or both. In some designs, the ML-based classifier or regressor is trained based on the probability distribution, the set of vectorized data attributes, and the cloud resource class-specific resource criticality scores. In some designs, the set of vectorized data attributes is obtained by:

passing a first set of information samples in textual form through a ML-based sentence transformer to produce a set of fixed-length text vectors, or
transforming a second set of information samples into n-gram representations, or
a combination thereof.

Similarly, in some designs, the converting of 920 comprises:
passing a first set of information samples in textual form through a ML-based sentence transformer to produce a set of fixed-length text vectors, or
transforming a second set of information samples into n-gram representations, or
a combination thereof.

Referring to FIG. 9, in some designs, the vectorized data comprises data that is produced via a ML-based sentence transformer and the ML-based classifier or regressor comprises a neural network (NN), or the vectorized data comprises n-gram representations and the ML-based classifier or regressor is configured to perform logistic regression on the n-gram representations.

Referring to FIG. 9, in some designs, the one or more infrastructure security functions comprise:
performing a security scan on the cloud resource, or
performing one or more actions to mitigate and/or remediate a vulnerability and/or exploit associated with the cloud resource, or
outputting a security report associated with the cloud resource, or
any combination thereof.

Referring to FIGS. 8-9, in a specific example, a typical cloud resource is described by a configuration file that contains a number of attributes, including processor, equipped memory, security policies, network configuration, lifecycle policies, user-given tags, and more. Each category may also have additional sub-categories, resulting in thousands of possible attribute combinations.

In an aspect of the disclosure, a systematic approach may be implemented to assign values to each attribute based on its probability distribution as a first stage. For instance, if an attribute has a rare value, the attribute will receive +1 point. If an attribute value falls within a range, quantiles may be analyzed and used to award +1 point for the top 50%. Another award point may be allocated to the top 5%. For attributes of string types, additional processing may be performed to extract the most unique keywords and assign points similarly.

FIG. 10 illustrates an example distribution lookup table 1000 for cloud resources in a cloud resource class, in accordance with an example implementation of the processes 900-1000 of FIGS. 9-10, respectively. In FIG. 10, distributions of the following attributes are analyzed with respect to a particular cloud resource class:
Cost: A distribution of costs of the cloud resources.
Has GPU: A proportion of the cloud resources that comprise GPUs.
Memory [GB]: A distribution of storage of the cloud resources, in units of gigabytes (GBs).
Logging Enabled: A proportion of cloud resources with logging enabled (e.g., syslog logging via Apache servers, etc.).
Backup Retention Days: A distribution of backup retention data days supported by the cloud resources.
Has Snapshots: A proportion of cloud resources that support snapshots (e.g., disk snapshots, cloud resource snapshots, etc.).

Encrypted Disk: A proportion of cloud resources with encrypted storage.

Network Performance: A proportion of the cloud resource network performance (e.g., at cloud network level, or cloud resource level).

Has Replicas: A proportion of cloud resources with replicas.

Has Autobackups: A proportion of cloud resources with autobackups.

Publicly Accessible: A proportion of cloud resources that are publicly accessible.

SSD Storage: A proportion of cloud resources with solid state drive (SSD) storage.

Storage in GB: A distribution of storage of the cloud resources, in units of gigabytes (GBs).

Input/Output Operations (IOPS): a distribution of the number of IOPS the cloud resource can complete within a single second.

FIG. 11 illustrates an example language tokenizer table 1100 for string-based attributes of cloud resources in a cloud resource class, in accordance with an example implementation of the processes 900-1000 of FIGS. 9-10, respectively. In FIG. 11, tokens with "is relevant"=1 are awarded a point if present within the string-based attribute, while tokens with "is relevant"=0 are not awarded a point if present within the string-based attribute.

FIGS. 12-15 illustrate example results 1200-1500 of processed cloud resource objects, in accordance with aspects of the disclosure. In particular, the results 1200-1500 are based on the distribution lookup table 1000 of FIG. 10 and the language tokenizer table 1100 of FIG. 11.

Referring to FIGS. 12-15, for each type of cloud resource, such as databases or servers, the scores obtained for their attributes are scaled from 0 to 10. In an aspect, labels in the form of a criticality score (ranging from 0 to 10) from raw JSON configuration files are produced. These labels can be used to train ML-based algorithms when there is no fully-labeled data available from users. Although these labels are considered "weak" due to their less precise nature, such labels may still provide useful information for a point award scheme (e.g., 1 point per detected relevant label). Furthermore, such labels facilitate the prediction of scores for new configuration files without the need to store previously estimated probability distributions.

To work with a classifier, the obtained configuration files are first converted into vectors, as shown in FIG. 11. In an example, this can be achieved by passing the configuration in textual form to a neural network called a sentence transformer. The sentence transformer produces a fixed-length vector of size 300 characters for a given text, or alternatively an n-gram representation may be obtained, which in some designs may result in a large vector (e.g., 50,000 items or more). This vector representation is then suitable for use as input to train a classifier or regressor. In some designs, the choice of classifier would depend on the applied vectorizer. For instance, if the sentence transformer is utilized, a suitable classifier could be a neural network. In another example, if n-gram representations are utilized, it may be more appropriate to use a classifier that works well with sparse data, such as logistic regression.

Figure 16:
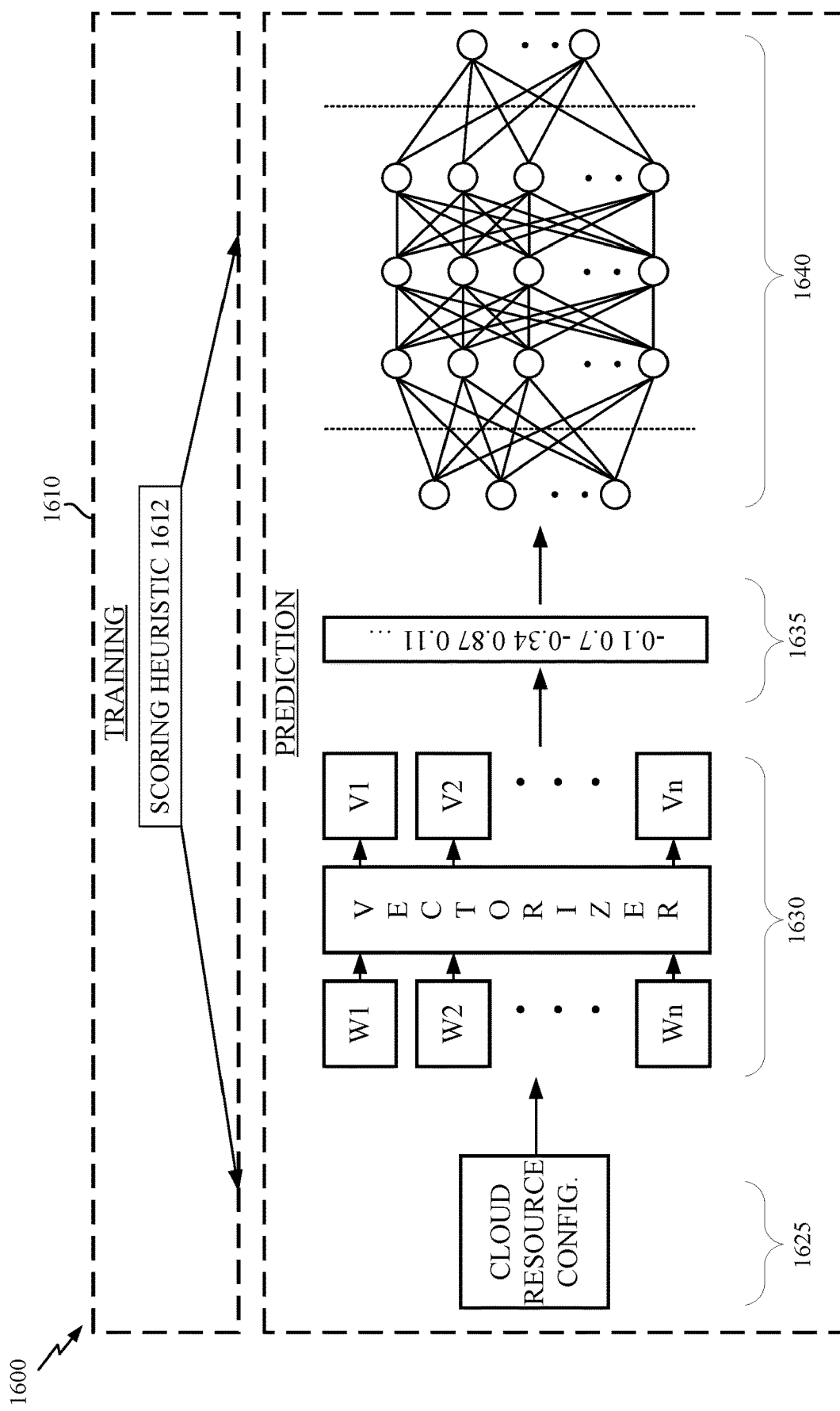
FIG. 16 illustrates a workflow diagram in accordance with an example implementation of the processes of FIGS. 9-10, respectively.

FIG. 16 illustrates a workflow diagram 1600 in accordance with an example implementation of the processes 900-1000 of FIGS. 9-10, respectively. The workflow diagram 1600 comprises a training stage 1610 and a prediction stage 1620. Scoring heuristics 1612 are obtained based on training data during the training stage 1610. These scoring heuristics 1612 are then applied via regressor/classifier during the prediction stage 1620. In this example, a cloud resource configuration 1625 (e.g., JSON file) is vectorized at 1630 to produce an output 1635. The output 1635 is input to the ML-based regressor/classifier at 1640 to produce an ACR for the cloud resource. As noted above, both the training stage 1610 and the prediction stage 1620 may be implemented in a cloud resource class-specific manner (e.g., the training data used to train the regressor/classifier is associated with the same cloud resource class as the cloud resource for which the ACR is assigned by the regressor/classifier at 1640).

Referring to FIG. 16, in a specific example, each extracted attribute is assigned to one of the predefined categories. For instance, after processing all the training data, 100 different attributes for cloud resources may be extracted. Then, the extracted attributes are split into expected categories, such as cost, networking, security, hardware, software, etc.

Referring to FIG. 16, in a specific example, in addition to giving scores for rare events, a point is also awarded to the total score for a given category to which a specific attribute belongs. This way, additional mappings from the configuration file are obtained for each category. For example, we can have a mapping that says a given configuration has a criticality score of 6, where 2.5 points are attributed to the cost of the described instance, 0.5 to security, 2 to software, and 1 to networking.

Referring to FIG. 16, in a specific example, this type of information is sufficient for training additional machine learning models that aim to predict the fraction of a given category within a vectorized configuration file. This approach allows for customization of the results according to the end-user's requirements. For example, an end-user can decide that hardware cost is irrelevant and remove it from the results. Alternatively, the end-user can decide to give security double importance.

Figure 17:
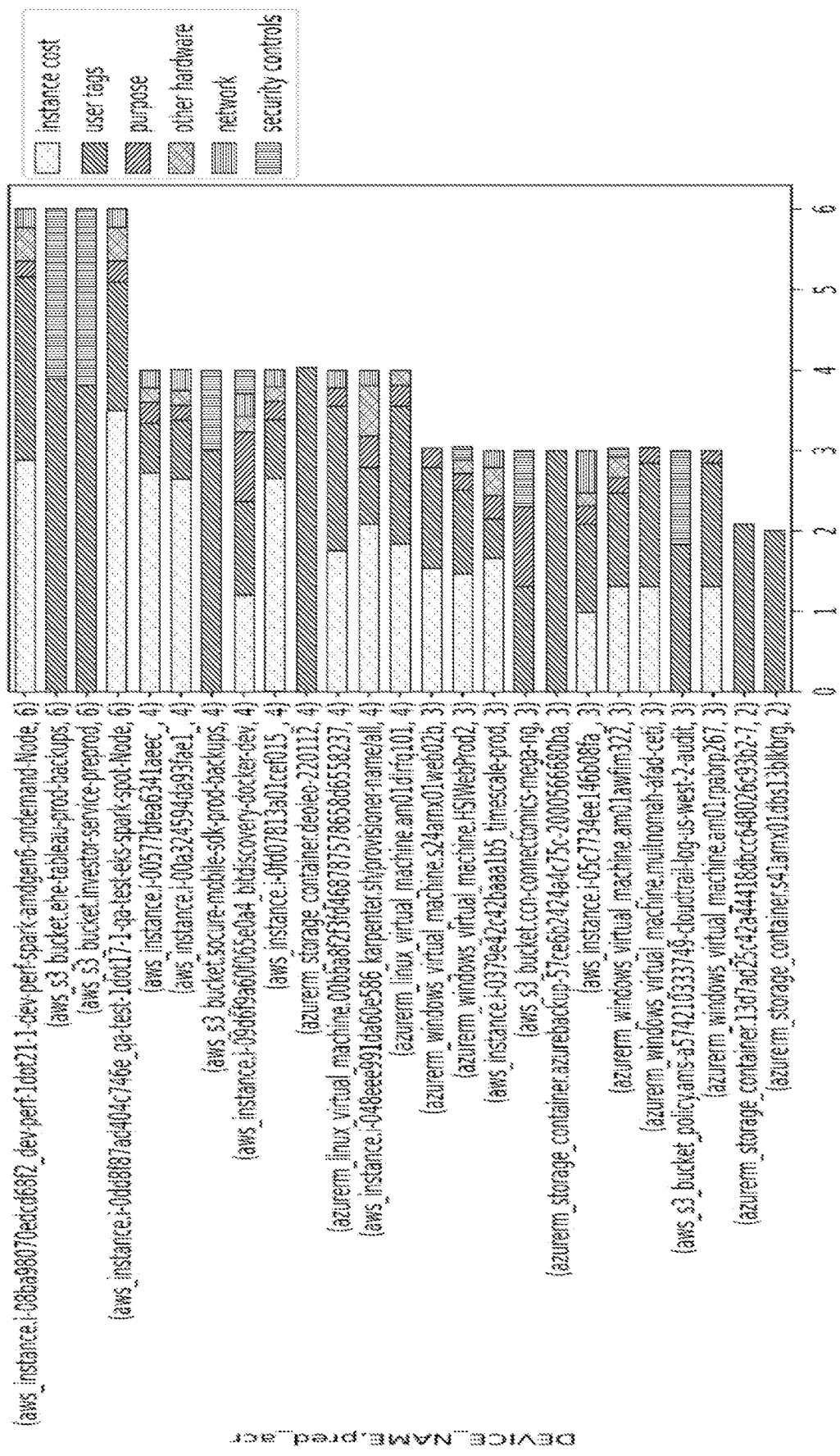
FIG. 17 illustrates example asset criticality rating (ACR) results in accordance with an example implementation of the processes of FIGS. 9-10, respectively.

FIG. 17 illustrates example ACR results 1700 in accordance with an example implementation of the processes 900-1000 of FIGS. 9-10, respectively. In FIG. 17, the x-axis depicts the ACR, and each y-axis level depicts a different processed cloud resource. Further depicted in FIG. 17 is the contribution to each ACR from the categories of instance cost, user tags, purpose, other hardware, network and security controls.

Figure 18:
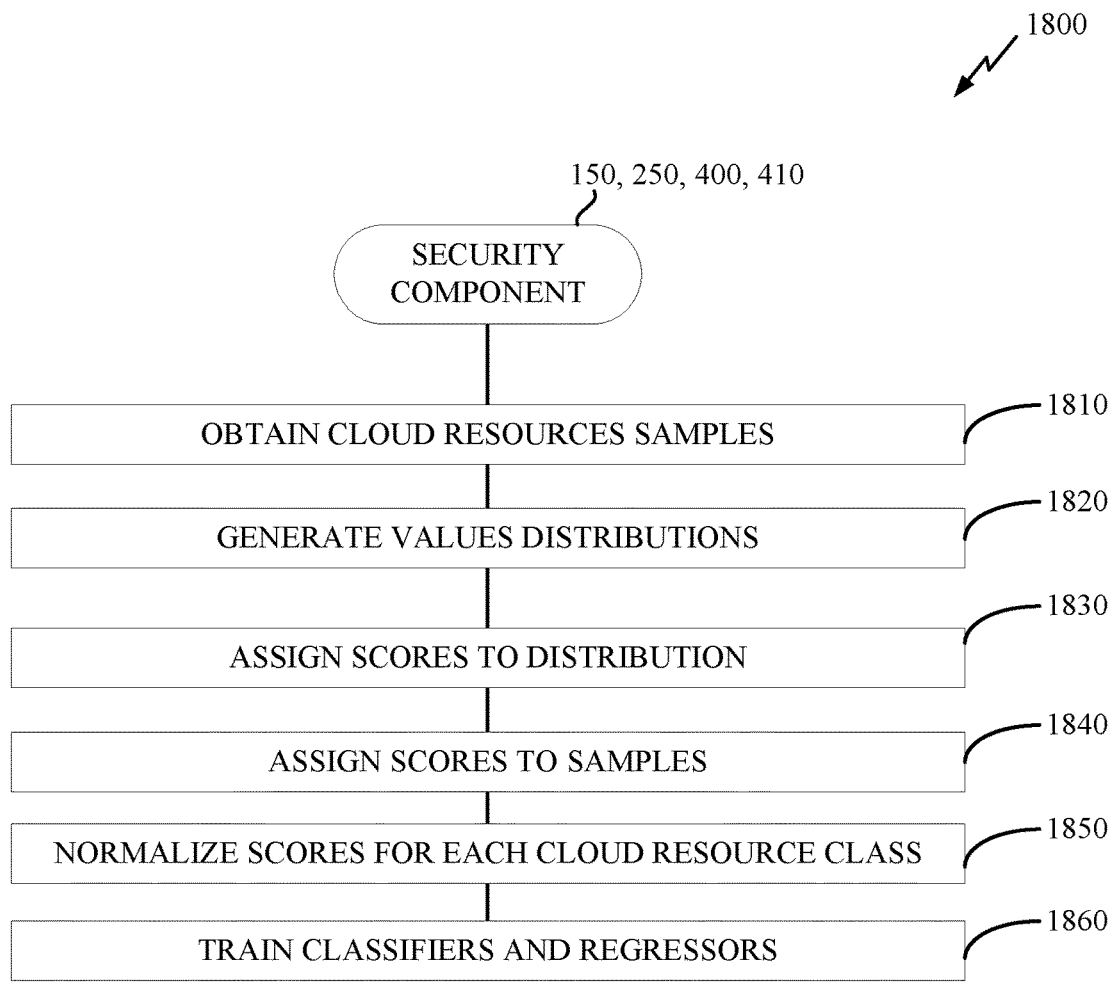
FIG. 18 illustrates a training stage for cloud resource classifiers/regressors by cloud resource class, in accordance with aspects of the disclosure.

FIG. 18 illustrates a training stage 1800 for cloud resource classifiers/regressors by cloud resource class, in accordance with aspects of the disclosure. In particular, the training stage of 1800 corresponds to an example implementation of the process 800 of FIG. 8.

Referring to FIG. 18, at 1810, cloud resource samples are obtained. At 1820, value distributions are generated by cloud resource class. At 1830, scores are assigned to the distributions of cloud resources by cloud resource class. At 1840, scores are assigned to samples (e.g., of configuration files such as JSON files). At 1850, the scores are normalized for each cloud resource class. At 1860, the normalized scores are used as training data for the classifiers/regressors.

Figure 19:
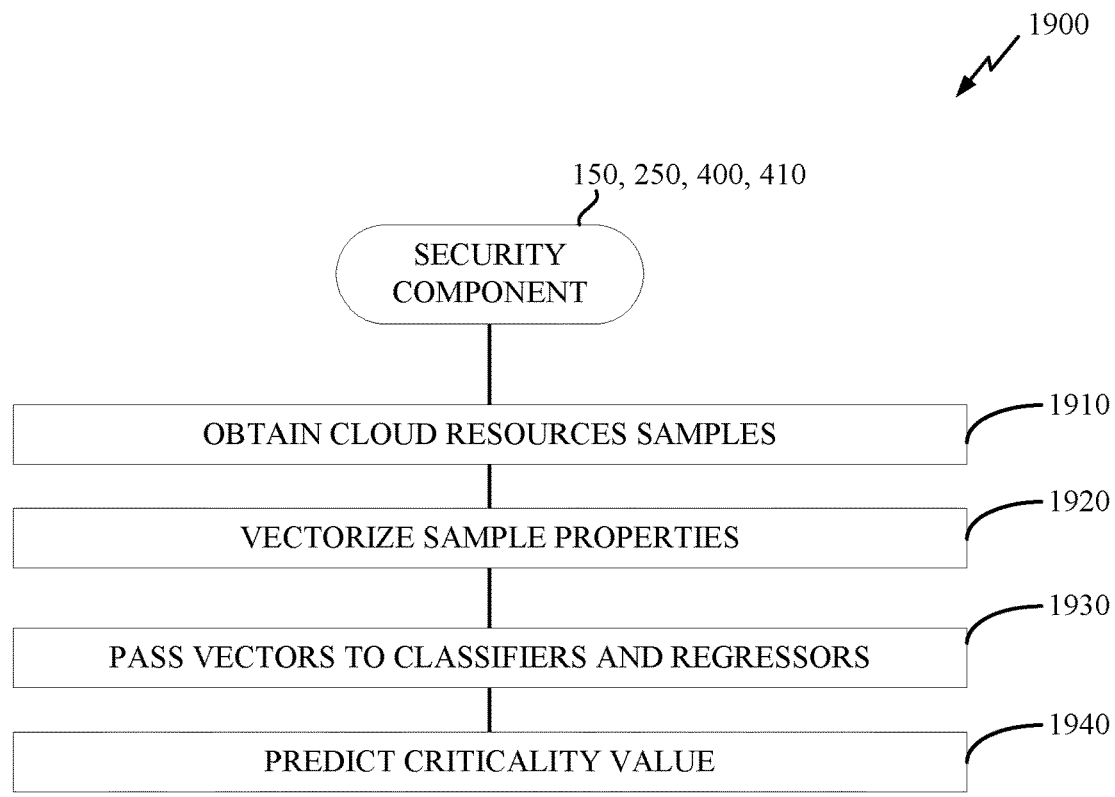
FIG. 19 illustrates a prediction stage for cloud resource ACRs, in accordance with aspects of the disclosure.

FIG. 19 illustrates a prediction stage 1900 for cloud resource ACRs, in accordance with aspects of the disclosure. In particular, the prediction stage of 1900 corresponds to an example implementation of the process 900 of FIG. 9.

Referring to FIG. 19, at 1910, cloud resource samples are obtained for a particular cloud resource in a particular cloud resource class. At 1920, the sample properties obtained at 1910 are vectorized. At 1930, the vectors are passed to the classifier(s)/regressor(s) trained for the particular cloud resource class. At 1940, the ACR for the cloud resource is predicted (i.e., corresponding to the output of the classifier(s)/regressor(s) from 1930).

Referring to FIGS. 9-19, in some designs, the processing for training that may be done offline is intensive, while the logic of the procedure for scoring production samples is significantly less complex. In some designs, if one decides to update rules for heuristics, only the new models have to be redistributed, and all the code can stay unchanged. In some designs, the exact rules of assigning criticality do not have to be revealed to end-users. In some designs, the above-noted technique for calculating criticality values is non-intrusive and relies only on obtained metadata from the cloud provider and other external sources.

In some designs, at least some of the features of the cloud resource(s) that may be used in the above-noted processes that may be protected (e.g., not revealed), may include any of the following:
- Cost
- Location within a network, proximity to critical assets
- Internet exposure
- Prevalence of similar type assets across customer base
- Lifetime of the asset
- How quickly misconfigurations are addressed
- Relationship to certain groups
- Number and type of tags used on the asset
- Who owns the asset, e.g.: Privileges, seniority in the company
- Security measures such as, e.g.: Encryption, Presence of security controls, frequency of assessment Referring to FIGS. 9-19, in some designs, ACR for cloud resources may be derived from a combination of, e.g.:
- Cost, spec, software, purpose, other hardware, security controls, etc.
- Customer provided and implicit tags (e.g., device name, description, security group name)
- Other information that can be extracted such as backup policy, snapshots, upkeep, SLA
- Note: In some designs, the above-noted information is clearly provided in config and cloud resource files Referring to FIGS. 9-19, in some designs, cloud resource information sources include, e.g.:
- Collected cloud configuration files (large JSON files)
- Customer tags
- Implicit tags
- External sources Referring to FIGS. 9-19, in some designs, a tags-based processing approach may include, e.g.:
- Tokenization of human populated fields
- Higher weights for tags at more expensive assets
- Calculation of tags importance and scoring Referring to FIGS. 9-19, in a specific example, the following cloud resource classes may be supported with respect to Instances, e.g.:
- Azure: azurerm_virtual_machine, azurerm_linux_virtual_machine, azurerm_windows_virtual_machine
- AWS: aws_instance
- Google Cloud Platform (TCP): google_compute_instance Referring to FIGS. 9-19, in a specific example, the following cloud resource classes may be supported with respect to Buckets/Storage, e.g.: Aws_s3_bucket, aws_s3_bucket_policy, google_storage_bucket_access_control, google_storage_bucket, azurerm_storage_management_policy, azurerm_storage_container Referring to FIGS. 9-19, in a specific example, the following cloud resource classes may be supported with respect to relational databases (RDSs), e.g.: azurerm_postgresql_server, azurerm_mssql_virtual_machine, aws_athena_database, azurerm_mysql_server, azurerm_sql_database, aws_emr_cluster, aws_db_instance, aws_rds_cluster_instance, google_bigquery_table, azurerm_sql_server, azurerm_mssql_server, google_bigquery_dataset, azurerm_synapse_sql_pool, google_sql_database, aws_db_snapshot, aws_rds_cluster, azurerm_mysql_database, aws_redshift_cluster, azurerm_data_lake_store, google_sql_database_instance, azurerm_postgresql_database, azurerm_mariadb_server, azurerm_cosmos_db.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a security component, comprising: receiving one or more information samples that characterize one or more attributes of a cloud resource of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein the cloud resource is associated with a set of shareable hardware and/or software resources of the backend platform, and wherein the cloud resource is associated with a cloud resource class that corresponds to one of a plurality of cloud resource classes supported by the cloud network; converting the one or more information samples into vectorized data associated with a set of attribute categories; deriving a resource criticality score associated with the cloud resource based on the vectorized data and a machine-learning (ML)-based classifier or regressor that is trained based on training data associated with the cloud resource class that is processed by rule-based heuristics; and performing one or more infrastructure security functions based on the resource criticality score associated with the cloud resource.

Clause 2. The method of clause 1, wherein the one or more information samples comprise: cost information, or software information, or purpose information, or security control information, or customer-defined tag information, or component-specific configuration information, or cloud network configuration information, information extracted from an operating system (OS) of the component, or any combination thereof.

Clause 3. The method of clause 2, wherein the one or more information samples are associated with a JavaScript Object Notation (JSON) configuration file.

Clause 4. The method of any of clauses 1 to 3, wherein the cloud resource class corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

Clause 5. The method of any of clauses 1 to 4, wherein the cloud network is a public cloud network, a private cloud network, a hybrid cloud network, or a multicloud network.

Clause 6. The method of any of clauses 1 to 5, wherein the rule-based heuristics associated with the cloud resource class comprise: determining a probability distribution of a set of vectorized data attributes associated with a training cloud resource associated with the cloud resource class; assigning a score to each vectorized data attribute in the set of vectorized data attributes based on the probability distribution; scaling each score in accordance with a cloud resource class-specific scaling factor; and normalizing each scaled score for each cloud resource class to produce cloud resource class-specific resource criticality scores.

Clause 7. The method of clause 6, wherein the probability distribution is associated with one or more lookup tables, one or more language tokens, or both.

Clause 8. The method of any of clauses 6 to 7, wherein the ML-based classifier or regressor is trained based on the probability distribution, the set of vectorized data attributes, and the cloud resource class-specific resource criticality scores.

Clause 9. The method of any of clauses 6 to 8, wherein the set of vectorized data attributes is obtained by: passing a first set of information samples in textual form through a ML-based sentence transformer to produce a set of fixed-length text vectors, or transforming a second set of information samples into n-gram representations, or a combination thereof.

Clause 10. The method of any of clauses 1 to 9, wherein the converting comprises: passing a first set of information samples in textual form through a ML-based sentence transformer to produce a set of fixed-length text vectors, or transforming a second set of information samples into n-gram representations, or a combination thereof.

Clause 11. The method of any of clauses 1 to 10, wherein the vectorized data comprises data that is produced via a ML-based sentence transformer and the ML-based classifier or regressor comprises a neural network (NN), or wherein the vectorized data comprises n-gram representations and the ML-based classifier or regressor is configured to perform logistic regression on the n-gram representations.

Clause 12. The method of any of clauses 1 to 11, wherein the one or more infrastructure security functions comprise: performing a security scan on the cloud resource, or performing one or more actions to mitigate and/or remediate a vulnerability and/or exploit associated with the cloud resource, or outputting a security report associated with the cloud resource, or any combination thereof.

Clause 13. A method of operating a training component, comprising: receiving information samples that characterize attributes of a set of cloud resources of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein each cloud resource of the set of cloud resources is associated with a set of shareable hardware and/or software resources of the backend platform, and wherein each cloud resource of the set of cloud resources is associated with a cloud resource class that corresponds to one of a plurality of cloud resource classes supported by the cloud network; assigning resource criticality scores for each cloud resource class associated with the set of cloud resource classes based on the information samples and rule-based heuristics; and training, for each cloud resource class associated with the set of cloud resource classes, a machine-learning (ML)-based classifier or regressor associated with the respective cloud resource class by inputting the information samples and the resource criticality scores for the respective cloud resource class as training data.

Clause 14. The method of clause 13, wherein the assigning comprises, for each cloud resource of the set of cloud resources: determining a probability distribution of a set of vectorized data attributes associated with the cloud resource associated with the cloud resource class; assigning a score to each vectorized data attribute in the set of vectorized data attributes based on the probability distribution; scaling each score in accordance with a cloud resource class-specific scaling factor; and normalizing each scaled score for each cloud resource class to produce cloud resource class-specific resource criticality scores.

Clause 15. The method of clause 14, wherein the probability distribution is associated with one or more lookup tables, one or more language tokens, or both.

Clause 16. The method of any of clauses 14 to 15, wherein the ML-based classifier or regressor is trained based on the probability distribution, the set of vectorized data attributes, and the cloud resource class-specific resource criticality scores.

Clause 17. The method of any of clauses 14 to 16, wherein the set of vectorized data attributes is obtained by: passing a first set of information samples in textual form through a ML-based sentence transformer to produce a set of fixed-length text vectors, or transforming a second set of information samples into n-gram representations, or a combination thereof.

Clause 18. The method of any of clauses 14 to 17, wherein the set of vectorized data attributes comprises vectorized data that is vectorized from the information samples.

Clause 19. The method of clause 18, wherein the vectorized data comprises data that is produced via a ML-based sentence transformer and the ML-based classifier or regressor comprises a neural network (NN), or wherein the vectorized data comprises n-gram representations and the ML-based classifier or regressor is configured to perform logistic regression on the n-gram representations.

Clause 20. The method of any of clauses 13 to 19, further comprising: refining, for at least one cloud resource class associated with the set of cloud resource classes, the ML-based classifier or regressor associated with the at least one cloud resource class by inputting new information samples and new resource criticality scores for the at least one cloud resource class as new training data.

Clause 21. The method of any of clauses 13 to 20, wherein the information samples comprise: cost information, or software information, or purpose information, or security control information, or customer-defined tag information, or component-specific configuration information, or cloud network configuration information, information extracted from an operating system (OS) of the component, or any combination thereof.

Clause 22. The method of clause 21, wherein the information samples are associated with a JavaScript Object Notation (JSON) configuration file.

Clause 23. The method of any of clauses 13 to 22, wherein at least one cloud resource cloud of the set of cloud resources corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

Clause 24. The method of any of clauses 13 to 23, wherein the cloud network is a public cloud network, a private cloud network, a hybrid cloud network, or a multicloud network.

Clause 25. A security component, comprising: one or more memories; one or more transceivers; and one or more processors communicatively coupled to the one or more memories and the one or more transceivers, the one or more processors, either alone or in combination, configured to: receive, via the one or more transceivers, one or more information samples that characterize one or more attributes of a cloud resource of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein the cloud resource is associated with a set of shareable hardware and/or software resources of the backend platform, and wherein the cloud resource is associated with a cloud resource class that corresponds to one of a plurality of cloud resource classes supported by the cloud network; convert the one or more information samples into vectorized data associated with a set of attribute categories; derive a resource criticality score associated with the cloud resource based on the vectorized data and a machine-learning (ML)-based classifier or regressor that is trained based on training data associated with the cloud resource class that is processed by rule-based heuristics; and perform one or more infrastructure security functions based on the resource criticality score associated with the cloud resource.

Clause 26. The security component of clause 25, wherein the one or more information samples comprise: cost information, or software information, or purpose information, or security control information, or customer-defined tag information, or component-specific configuration information, or cloud network configuration information, information extracted from an operating system (OS) of the component, or any combination thereof.

Clause 27. The security component of clause 26, wherein the one or more information samples are associated with a JavaScript Object Notation (JSON) configuration file.

Clause 28. The security component of any of clauses 25 to 27, wherein the cloud resource class corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

Clause 29. The security component of any of clauses 25 to 28, wherein the cloud network is a public cloud network, a private cloud network, a hybrid cloud network, or a multicloud network.

Clause 30. The security component of any of clauses 25 to 29, wherein the rule-based heuristics associated with the cloud resource class comprise: determine a probability distribution of a set of vectorized data attributes associated with a training cloud resource associated with the cloud resource class; assign a score to each vectorized data attribute in the set of vectorized data attributes based on the probability distribution; scale each score in accordance with a cloud resource class-specific scaling factor; and normalize each scaled score for each cloud resource class to produce cloud resource class-specific resource criticality scores.

Clause 31. The security component of clause 30, wherein the probability distribution is associated with one or more lookup tables, one or more language tokens, or both.

Clause 32. The security component of any of clauses 30 to 31, wherein the ML-based classifier or regressor is trained based on the probability distribution, the set of vectorized data attributes, and the cloud resource class-specific resource criticality scores.

Clause 33. The security component of any of clauses 30 to 32, wherein the set of vectorized data attributes is obtained by: pass a first set of information samples in textual form through a ML-based sentence transformer to produce a set of fixed-length text vectors, or transform a second set of information samples into n-gram representations, or a combination thereof.

Clause 34. The security component of any of clauses 25 to 33, wherein the converting comprises: pass a first set of information samples in textual form through a ML-based sentence transformer to produce a set of fixed-length text vectors, or transform a second set of information samples into n-gram representations, or a combination thereof.

Clause 35. The security component of any of clauses 25 to 34, wherein the vectorized data comprises data that is produced via a ML-based sentence transformer and the ML-based classifier or regressor comprises a neural network (NN), or wherein the vectorized data comprises n-gram representations and the ML-based classifier or regressor is configured to perform logistic regression on the n-gram representations.

Clause 36. The security component of any of clauses 25 to 35, wherein the one or more infrastructure security functions comprise: perform a security scan on the cloud resource, or perform one or more actions to mitigate and/or remediate a vulnerability and/or exploit associated with the cloud resource, or outputting a security report associated with the cloud resource, or any combination thereof.

Clause 37. A training component, comprising: one or more memories; one or more transceivers; and one or more processors communicatively coupled to the one or more memories and the one or more transceivers, the one or more processors, either alone or in combination, configured to: receive, via the one or more transceivers, information samples that characterize attributes of a set of cloud resources of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein each cloud resource of the set of cloud resources is associated with a set of shareable hardware and/or software resources of the backend platform, and wherein each cloud resource of the set of cloud resources is associated with a cloud resource class that corresponds to one of a plurality of cloud resource classes supported by the cloud network; assign resource criticality scores for each cloud resource class associated with the set of cloud resource classes based on the information samples and rule-based heuristics; and train, for each cloud resource class associated with the set of cloud resource classes, a machine-learning (ML)-based classifier or regressor associated with the respective cloud resource class by inputting the information samples and the resource criticality scores for the respective cloud resource class as training data.

Clause 38. The training component of clause 37, wherein the assigning comprises, for each cloud resource of the set of cloud resources: determine a probability distribution of a set of vectorized data attributes associated with the cloud resource associated with the cloud resource class; assign a score to each vectorized data attribute in the set of vectorized data attributes based on the probability distribution; scale each score in accordance with a cloud resource class-specific scaling factor; and normalize each scaled score for each cloud resource class to produce cloud resource class-specific resource criticality scores.

Clause 39. The training component of clause 38, wherein the probability distribution is associated with one or more lookup tables, one or more language tokens, or both.

Clause 40. The training component of any of clauses 38 to 39, wherein the ML-based classifier or regressor is trained based on the probability distribution, the set of vectorized data attributes, and the cloud resource class-specific resource criticality scores.

Clause 41. The training component of any of clauses 38 to 40, wherein the set of vectorized data attributes is obtained by: pass a first set of information samples in textual form through a ML-based sentence transformer to produce a set of fixed-length text vectors, or transform a second set of information samples into n-gram representations, or a combination thereof.

Clause 42. The training component of any of clauses 38 to 41, wherein the set of vectorized data attributes comprises vectorized data that is vectorized from the information samples.

Clause 43. The training component of clause 42, wherein the vectorized data comprises data that is produced via a ML-based sentence transformer and the ML-based classifier or regressor comprises a neural network (NN), or wherein the vectorized data comprises n-gram representations and the ML-based classifier or regressor is configured to perform logistic regression on the n-gram representations.

Clause 44. The training component of any of clauses 37 to 43, wherein the one or more processors, either alone or in combination, are further configured to: refine, for at least one cloud resource class associated with the set of cloud resource classes, the ML-based classifier or regressor associated with the at least one cloud resource class by inputting new information samples and new resource criticality scores for the at least one cloud resource class as new training data.

Clause 45. The training component of any of clauses 37 to 44, wherein the information samples comprise: cost information, or software information, or purpose information, or security control information, or customer-defined tag information, or component-specific configuration information, or cloud network configuration information, information extracted from an operating system (OS) of the component, or any combination thereof.

Clause 46. The training component of clause 45, wherein the information samples are associated with a JavaScript Object Notation (JSON) configuration file.

Clause 47. The training component of any of clauses 37 to 46, wherein at least one cloud resource cloud of the set of cloud resources corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

Clause 48. The training component of any of clauses 37 to 47, wherein the cloud network is a public cloud network, a private cloud network, a hybrid cloud network, or a multicloud network.

Clause 49. A security component, comprising: means for receiving one or more information samples that characterize one or more attributes of a cloud resource of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein the cloud resource is associated with a set of shareable hardware and/or software resources of the backend platform, and wherein the cloud resource is associated with a cloud resource class that corresponds to one of a plurality of cloud resource classes supported by the cloud network; means for converting the one or more information samples into vectorized data associated with a set of attribute categories; means for deriving a resource criticality score associated with the cloud resource based on the vectorized data and a machine-learning (ML)-based classifier or regressor that is trained based on training data associated with the cloud resource class that is processed by rule-based heuristics; and means for performing one or more infrastructure security functions based on the resource criticality score associated with the cloud resource.

Clause 50. The security component of clause 49, wherein the one or more information samples comprise: cost information, or software information, or purpose information, or security control information, or customer-defined tag information, or component-specific configuration information, or cloud network configuration information, information extracted from an operating system (OS) of the component, or any combination thereof.

Clause 51. The security component of clause 50, wherein the one or more information samples are associated with a JavaScript Object Notation (JSON) configuration file.

Clause 52. The security component of any of clauses 49 to 51, wherein the cloud resource class corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

Clause 53. The security component of any of clauses 49 to 52, wherein the cloud network is a public cloud network, a private cloud network, a hybrid cloud network, or a multicloud network.

Clause 54. The security component of any of clauses 49 to 53, wherein the rule-based heuristics associated with the cloud resource class comprise: means for determining a probability distribution of a set of vectorized data attributes associated with a training cloud resource associated with the cloud resource class; means for assigning a score to each vectorized data attribute in the set of vectorized data attributes based on the probability distribution; means for scaling each score in accordance with a cloud resource class-specific scaling factor; and means for normalizing each scaled score for each cloud resource class to produce cloud resource class-specific resource criticality scores.

Clause 55. The security component of clause 54, wherein the probability distribution is associated with one or more lookup tables, one or more language tokens, or both.

Clause 56. The security component of any of clauses 54 to 55, wherein the ML-based classifier or regressor is trained based on the probability distribution, the set of vectorized data attributes, and the cloud resource class-specific resource criticality scores.

Clause 57. The security component of any of clauses 54 to 56, wherein the set of vectorized data attributes is obtained by: means for passing a first set of information samples in textual form through a ML-based sentence transformer to produce a set of fixed-length text vectors, or means for transforming a second set of information samples into n-gram representations, or a combination thereof.

Clause 58. The security component of any of clauses 49 to 57, wherein the converting comprises: means for passing a first set of information samples in textual form through a ML-based sentence transformer to produce a set of fixed-length text vectors, or means for transforming a second set of information samples into n-gram representations, or a combination thereof.

Clause 59. The security component of any of clauses 49 to 58, wherein the vectorized data comprises data that is produced via a ML-based sentence transformer and the ML-based classifier or regressor comprises a neural network (NN), or wherein the vectorized data comprises n-gram representations and the ML-based classifier or regressor is configured to perform logistic regression on the n-gram representations.

Clause 60. The security component of any of clauses 49 to 59, wherein the one or more infrastructure security functions comprise: means for performing a security scan on the cloud resource, or means for performing one or more actions to mitigate and/or remediate a vulnerability and/or exploit associated with the cloud resource, or outputting a security report associated with the cloud resource, or any combination thereof.

Clause 61. A training component, comprising: means for receiving information samples that characterize attributes of a set of cloud resources of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein each cloud resource of the set of cloud resources is associated with a set of shareable hardware and/or software resources of the backend platform, and wherein each cloud resource of the set of cloud resources is associated with a cloud resource class that corresponds to one of a plurality of cloud resource classes supported by the cloud network; means for assigning resource criticality scores for each cloud resource class associated with the set of cloud resource classes based on the information samples and rule-based heuristics; and means for training, for each cloud resource class associated with the set of cloud resource classes, a machine-learning (ML)-based classifier or regressor associated with the respective cloud resource class by inputting the information samples and the resource criticality scores for the respective cloud resource class as training data.

Clause 62. The training component of clause 61, wherein the assigning comprises, for each cloud resource of the set of cloud resources: means for determining a probability distribution of a set of vectorized data attributes associated with the cloud resource associated with the cloud resource class; means for assigning a score to each vectorized data attribute in the set of vectorized data attributes based on the probability distribution; means for scaling each score in accordance with a cloud resource class-specific scaling factor; and means for normalizing each scaled score for each cloud resource class to produce cloud resource class-specific resource criticality scores.

Clause 63. The training component of clause 62, wherein the probability distribution is associated with one or more lookup tables, one or more language tokens, or both.

Clause 64. The training component of any of clauses 62 to 63, wherein the ML-based classifier or regressor is trained based on the probability distribution, the set of vectorized data attributes, and the cloud resource class-specific resource criticality scores.

Clause 65. The training component of any of clauses 62 to 64, wherein the set of vectorized data attributes is obtained by: means for passing a first set of information samples in textual form through a ML-based sentence transformer to produce a set of fixed-length text vectors, or means for transforming a second set of information samples into n-gram representations, or a combination thereof.

Clause 66. The training component of any of clauses 62 to 65, wherein the set of vectorized data attributes comprises vectorized data that is vectorized from the information samples.

Clause 67. The training component of clause 66, wherein the vectorized data comprises data that is produced via a ML-based sentence transformer and the ML-based classifier or regressor comprises a neural network (NN), or wherein the vectorized data comprises n-gram representations and the ML-based classifier or regressor is configured to perform logistic regression on the n-gram representations.

Clause 68. The training component of any of clauses 61 to 67, further comprising: means for refining, for at least one cloud resource class associated with the set of cloud resource classes, the ML-based classifier or regressor associated with the at least one cloud resource class by inputting new information samples and new resource criticality scores for the at least one cloud resource class as new training data.

Clause 69. The training component of any of clauses 61 to 68, wherein the information samples comprise: cost information, or software information, or purpose information, or security control information, or customer-defined tag information, or component-specific configuration information, or cloud network configuration information, information extracted from an operating system (OS) of the component, or any combination thereof.

Clause 70. The training component of clause 69, wherein the information samples are associated with a JavaScript Object Notation (JSON) configuration file.

Clause 71. The training component of any of clauses 61 to 70, wherein at least one cloud resource cloud of the set of cloud resources corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

Clause 72. The training component of any of clauses 61 to 71, wherein the cloud network is a public cloud network, a private cloud network, a hybrid cloud network, or a multicloud network.

Clause 73. A non-transitory computer-readable medium storing computer-executable instructions that, when executed by a security component, cause the security component to: receive one or more information samples that characterize one or more attributes of a cloud resource of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein the cloud resource is associated with a set of shareable hardware and/or software resources of the backend platform, and wherein the cloud resource is associated with a cloud resource class that corresponds to one of a plurality of cloud resource classes supported by the cloud network; convert the one or more information samples into vectorized data associated with a set of attribute categories; derive a resource criticality score associated with the cloud resource based on the vectorized data and a machine-learning (ML)-based classifier or regressor that is trained based on training data associated with the cloud resource class that is processed by rule-based heuristics; and perform one or more infrastructure security functions based on the resource criticality score associated with the cloud resource.

Clause 74. The non-transitory computer-readable medium of clause 73, wherein the one or more information samples comprise: cost information, or software information, or purpose information, or security control information, or customer-defined tag information, or component-specific configuration information, or cloud network configuration information, information extracted from an operating system (OS) of the component, or any combination thereof.

Clause 75. The non-transitory computer-readable medium of clause 74, wherein the one or more information samples are associated with a JavaScript Object Notation (JSON) configuration file.

Clause 76. The non-transitory computer-readable medium of any of clauses 73 to 75, wherein the cloud resource class corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

Clause 77. The non-transitory computer-readable medium of any of clauses 73 to 76, wherein the cloud network is a public cloud network, a private cloud network, a hybrid cloud network, or a multicloud network.

Clause 78. The non-transitory computer-readable medium of any of clauses 73 to 77, wherein the rule-based heuristics associated with the cloud resource class comprise: determine a probability distribution of a set of vectorized data attributes associated with a training cloud resource associated with the cloud resource class; assign a score to each vectorized data attribute in the set of vectorized data attributes based on the probability distribution; scale each score in accordance with a cloud resource class-specific scaling factor; and normalize each scaled score for each cloud resource class to produce cloud resource class-specific resource criticality scores.

Clause 79. The non-transitory computer-readable medium of clause 78, wherein the probability distribution is associated with one or more lookup tables, one or more language tokens, or both.

Clause 80. The non-transitory computer-readable medium of any of clauses 78 to 79, wherein the ML-based classifier or regressor is trained based on the probability distribution, the set of vectorized data attributes, and the cloud resource class-specific resource criticality scores.

Clause 81. The non-transitory computer-readable medium of any of clauses 78 to 80, wherein the set of vectorized data attributes is obtained by: pass a first set of information samples in textual form through a ML-based sentence transformer to produce a set of fixed-length text vectors, or transform a second set of information samples into n-gram representations, or a combination thereof.

Clause 82. The non-transitory computer-readable medium of any of clauses 73 to 81, wherein the converting comprises: pass a first set of information samples in textual form through a ML-based sentence transformer to produce a set of fixed-length text vectors, or transform a second set of information samples into n-gram representations, or a combination thereof.

Clause 83. The non-transitory computer-readable medium of any of clauses 73 to 82, wherein the vectorized data comprises data that is produced via a ML-based sentence transformer and the ML-based classifier or regressor comprises a neural network (NN), or wherein the vectorized data comprises n-gram representations and the ML-based classifier or regressor is configured to perform logistic regression on the n-gram representations.

Clause 84. The non-transitory computer-readable medium of any of clauses 73 to 83, wherein the one or more infrastructure security functions comprise: perform a security scan on the cloud resource, or perform one or more actions to mitigate and/or remediate a vulnerability and/or exploit associated with the cloud resource, or outputting a security report associated with the cloud resource, or any combination thereof.

Clause 85. A non-transitory computer-readable medium storing computer-executable instructions that, when executed by a training component, cause the training component to: receive information samples that characterize attributes of a set of cloud resources of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein each cloud resource of the set of cloud resources is associated with a set of shareable hardware and/or software resources of the backend platform, and wherein each cloud resource of the set of cloud resources is associated with a cloud resource class that corresponds to one of a plurality of cloud resource classes supported by the cloud network; assign resource criticality scores for each cloud resource class associated with the set of cloud resource classes based on the information samples and rule-based heuristics; and train, for each cloud resource class associated with the set of cloud resource classes, a machine-learning (ML)-based classifier or regressor associated with the respective cloud resource class by inputting the information samples and the resource criticality scores for the respective cloud resource class as training data.

Clause 86. The non-transitory computer-readable medium of clause 85, wherein the assigning comprises, for each cloud resource of the set of cloud resources: determine a probability distribution of a set of vectorized data attributes associated with the cloud resource associated with the cloud resource class; assign a score to each vectorized data attribute in the set of vectorized data attributes based on the probability distribution; scale each score in accordance with a cloud resource class-specific scaling factor; and normalize each scaled score for each cloud resource class to produce cloud resource class-specific resource criticality scores.

Clause 87. The non-transitory computer-readable medium of clause 86, wherein the probability distribution is associated with one or more lookup tables, one or more language tokens, or both.

Clause 88. The non-transitory computer-readable medium of any of clauses 86 to 87, wherein the ML-based classifier or regressor is trained based on the probability distribution, the set of vectorized data attributes, and the cloud resource class-specific resource criticality scores.

Clause 89. The non-transitory computer-readable medium of any of clauses 86 to 88, wherein the set of vectorized data attributes is obtained by: pass a first set of information samples in textual form through a ML-based sentence transformer to produce a set of fixed-length text vectors, or transform a second set of information samples into n-gram representations, or a combination thereof.

Clause 90. The non-transitory computer-readable medium of any of clauses 86 to 89, wherein the set of vectorized data attributes comprises vectorized data that is vectorized from the information samples.

Clause 91. The non-transitory computer-readable medium of clause 90, wherein the vectorized data comprises data that is produced via a ML-based sentence transformer and the ML-based classifier or regressor comprises a neural network (NN), or wherein the vectorized data comprises n-gram representations and the ML-based classifier or regressor is configured to perform logistic regression on the n-gram representations.

Clause 92. The non-transitory computer-readable medium of any of clauses 85 to 91, further comprising computer-executable instructions that, when executed by the training component, cause the training component to: refine, for at least one cloud resource class associated with the set of cloud resource classes, the ML-based classifier or regressor associated with the at least one cloud resource class by inputting new information samples and new resource criticality scores for the at least one cloud resource class as new training data.

Clause 93. The non-transitory computer-readable medium of any of clauses 85 to 92, wherein the information samples comprise: cost information, or software information, or purpose information, or security control information, or customer-defined tag information, or component-specific configuration information, or cloud network configuration information, information extracted from an operating system (OS) of the component, or any combination thereof.

Clause 94. The non-transitory computer-readable medium of clause 93, wherein the information samples are associated with a JavaScript Object Notation (JSON) configuration file.

Clause 95. The non-transitory computer-readable medium of any of clauses 85 to 94, wherein at least one cloud resource cloud of the set of cloud resources corresponds to: an Azure virtual machine, or an Amazon Web Services (AWS) instance, or a Google Cloud Processing (GCP) instance, or a relational database (RDB), or a storage bucket or storage container, or a billable resource type, or a combination thereof.

Clause 96. The non-transitory computer-readable medium of any of clauses 85 to 95, wherein the cloud network is a public cloud network, a private cloud network, a hybrid cloud network, or a multicloud network.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line, or wireless technologies such as infrared, radio, and microwave, then the coaxial cable, fiber optic cable, twisted pair, digital subscriber line, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of operating a security component, comprising:
   receiving one or more information samples that characterize one or more attributes of a cloud resource of a cloud network,
   wherein the cloud network comprises a frontend platform and a backend platform,
   wherein the frontend platform comprises frontend client infrastructure for interfacing with clients,
   wherein the backend platform comprises backend platform infrastructure that comprises a group of distributed and interconnected computing devices with shareable hardware and/or software resources that support distributed implementation of a set of cloud applications via a respective set of cloud resources,
   wherein the cloud resource is associated with a set of shareable hardware and/or software resources of the backend platform, and
   wherein the cloud resource is associated with a cloud resource class that corresponds to one of a plurality of cloud resource classes supported by the cloud network;
   converting the one or more information samples into vectorized data associated with a set of attribute categories;
   deriving a resource criticality score associated with the cloud resource based on the vectorized data and a machine-learning (ML)-based classifier or regressor that is trained based on training data associated with the cloud resource class that is processed by rule-based heuristics; and
   performing one or more infrastructure security functions based on the resource criticality score associated with the cloud resource.

2. The method of claim 1, wherein the one or more information samples comprise:
   cost information, or
   software information, or
   purpose information, or
   security control information, or
   customer-defined tag information, or
   component-specific configuration information, or
   cloud network configuration information,
   information extracted from an operating system (OS) of the component, or
   any combination thereof.

3. The method of claim 2, wherein the one or more information samples are associated with a JavaScript Object Notation (JSON) configuration file.

4. The method of claim 1, wherein the cloud resource class corresponds to:
   an Azure virtual machine, or
   an Amazon Web Services (AWS) instance, or
   a Google Cloud Processing (GCP) instance, or
   a relational database (RDB), or
   a storage bucket or storage container, or
   a billable resource type, or
   a combination thereof.

5. The method of claim 1, wherein the cloud network is a public cloud network, a private cloud network, a hybrid cloud network, or a multicloud network.

6. The method of claim 1, wherein the rule-based heuristics associated with the cloud resource class comprise:
   determining a probability distribution of a set of vectorized data attributes associated with a training cloud resource associated with the cloud resource class;
   assigning a score to each vectorized data attribute in the set of vectorized data attributes based on the probability distribution;
   scaling each score in accordance with a cloud resource class-specific scaling factor; and
   normalizing each scaled score for each cloud resource class to produce cloud resource class-specific resource criticality scores.

7. The method of claim 6, wherein the probability distribution is associated with one or more lookup tables, one or more language tokens, or both.

8. The method of claim 6, wherein the ML-based classifier or regressor is trained based on the probability distribution, the set of vectorized data attributes, and the cloud resource class-specific resource criticality scores.

9. The method of claim 6, wherein the set of vectorized data attributes is obtained by:

passing a first set of information samples in textual form through a ML-based sentence transformer to produce a set of fixed-length text vectors, or transforming a second set of information samples into n-gram representations, or a combination thereof.

10. The method of claim 1, wherein the converting comprises:

passing a first set of information samples in textual form through a ML-based sentence transformer to produce a set of fixed-length text vectors, or transforming a second set of information samples into n-gram representations, or a combination thereof.

11. The method of claim 1, wherein the vectorized data comprises data that is produced via a ML-based sentence transformer and the ML-based classifier or regressor comprises a neural network (NN), or wherein the vectorized data comprises n-gram representations and the ML-based classifier or regressor is configured to perform logistic regression on the n-gram representations.

12. The method of claim 1, wherein the one or more infrastructure security functions comprise:

performing a security scan on the cloud resource, or performing one or more actions to mitigate and/or remediate a vulnerability and/or exploit associated with the cloud resource, or outputting a security report associated with the cloud resource, or any combination thereof.

13. A security component, comprising:

one or more memories;

one or more transceivers; and one or more processors communicatively coupled to the one or more memories and the one or more transceivers, the one or more processors, either alone or in combination, configured to:

receive, via the one or more transceivers, one or more information samples that characterize one or more attributes of a cloud resource of a cloud network, wherein the cloud network comprises a frontend platform and a backend platform, wherein the frontend platform comprises frontend client infrastructure for interfacing with clients, wherein the backend platform comprises backend platform infrastructure that comprises a group of distributed and interconnected computing devices with shareable hardware and/or software resources that support distributed implementation of a set of cloud applications via a respective set of cloud resources, wherein the cloud resource is associated with a set of shareable hardware and/or software resources of the backend platform, and wherein the cloud resource is associated with a cloud resource class that corresponds to one of a plurality of cloud resource classes supported by the cloud network;

convert the one or more information samples into vectorized data associated with a set of attribute categories;

derive a resource criticality score associated with the cloud resource based on the vectorized data and a machine-learning (ML)-based classifier or regressor that is trained based on training data associated with the cloud resource class that is processed by rule-based heuristics; and perform one or more infrastructure security functions based on the resource criticality score associated with the cloud resource.

14. The security component of claim 13, wherein the one or more information samples comprise:

cost information, or software information, or purpose information, or security control information, or customer-defined tag information, or component-specific configuration information, or cloud network configuration information, information extracted from an operating system (OS) of the component, or any combination thereof.

15. The security component of claim 14, wherein the one or more information samples are associated with a JavaScript Object Notation (JSON) configuration file.

16. The security component of claim 13, wherein the cloud resource class corresponds to:

an Azure virtual machine, or an Amazon Web Services (AWS) instance, or a Google Cloud Processing (GCP) instance, or a relational database (RDB), or a storage bucket or storage container, or a billable resource type, or a combination thereof.

17. The security component of claim 13, wherein the cloud network is a public cloud network, a private cloud network, a hybrid cloud network, or a multicloud network.

18. The security component of claim 13, wherein the rule-based heuristics associated with the cloud resource class comprise:

determine a probability distribution of a set of vectorized data attributes associated with a training cloud resource associated with the cloud resource class;

assign a score to each vectorized data attribute in the set of vectorized data attributes based on the probability distribution;

scale each score in accordance with a cloud resource class-specific scaling factor; and normalize each scaled score for each cloud resource class to produce cloud resource class-specific resource criticality scores.

19. The security component of claim 18, wherein the probability distribution is associated with one or more lookup tables, one or more language tokens, or both.

20. The security component of claim 18, wherein the ML-based classifier or regressor is trained based on the probability distribution, the set of vectorized data attributes, and the cloud resource class-specific resource criticality scores.

21. The security component of claim 18, wherein the set of vectorized data attributes is obtained by:

pass a first set of information samples in textual form through a ML-based sentence transformer to produce a set of fixed-length text vectors, or transform a second set of information samples into n-gram representations, or a combination thereof.

22. The security component of claim 13, wherein the converting comprises:

pass a first set of information samples in textual form through a ML-based sentence transformer to produce a set of fixed-length text vectors, or transform a second set of information samples into n-gram representations, or a combination thereof.

23. The security component of claim 13,
wherein the vectorized data comprises data that is produced via a ML-based sentence transformer and the ML-based classifier or regressor comprises a neural network (NN), or
wherein the vectorized data comprises n-gram representations and the ML-based classifier or regressor is configured to perform logistic regression on the n-gram representations.

24. The security component of claim 13, wherein the one or more infrastructure security functions comprise:
perform a security scan on the cloud resource, or
perform one or more actions to mitigate and/or remediate a vulnerability and/or exploit associated with the cloud resource, or
outputting a security report associated with the cloud resource, or
any combination thereof.

* * * * *